(12) United States Patent
Gao

(10) Patent No.: US 11,044,205 B2
(45) Date of Patent: Jun. 22, 2021

(54) BANDWIDTH ADJUSTMENT METHOD AND APPARATUS, ELECTRONIC DEVICE, AND COMPUTER-READABLE STORAGE MEDIUM

(71) Applicants: Beijing Kingsoft Cloud Network Technology Co., Ltd., Beijing (CN); Beijing Kingsoft Cloud Technology Co., Ltd., Beijing (CN); Beijing Jinxun Ruibo Network Technology Co., Ltd, Beijing (CN)

(72) Inventor: Huaijin Gao, Beijing (CN)

(73) Assignees: BEIJING KINGSOFT CLOUD NETWORK TECHNOLOGY CO., LTD., Beijing (CN); BEIJING KINGSOFT CLOUD TECHNOLOGY CO., LTD., Beijing (CN); BEIJING JINXUN RUIBO NETWORK TECHNOLOGY CO., LTD, Beijing (CN)

(*) Notice: Subject to any disclaimer, the term of this patent is extended or adjusted under 35 U.S.C. 154(b) by 0 days.

(21) Appl. No.: 16/964,079

(22) PCT Filed: Dec. 30, 2018

(86) PCT No.: PCT/CN2018/125954
§ 371 (c)(1),
(2) Date: Jul. 22, 2020

(87) PCT Pub. No.: WO2019/144778
PCT Pub. Date: Aug. 1, 2019

(65) Prior Publication Data
US 2021/0036963 A1 Feb. 4, 2021

(30) Foreign Application Priority Data

Jan. 26, 2018 (CN) .......................... 201810077039.1

(51) Int. Cl.
*H04L 12/917* (2013.01)
*H04L 12/26* (2006.01)
(Continued)

(52) U.S. Cl.
CPC .......... *H04L 47/76* (2013.01); *H04L 43/0882* (2013.01); *H04L 47/29* (2013.01); *H04L 47/525* (2013.01); *H04L 47/527* (2013.01)

(58) Field of Classification Search
CPC ..... H04L 47/76; H04L 43/0882; H04L 47/29; H04L 47/525; H04L 47/527; H04L 47/10
See application file for complete search history.

(56) References Cited

U.S. PATENT DOCUMENTS 8,000,240 B2   8/2011  DelRegno et al.
10,110,300 B2* 10/2018 Xu ..................... H04B 7/18578
(Continued)

FOREIGN PATENT DOCUMENTS

CN      1671226 A    9/2005
CN    101023633 A    8/2007
(Continued)

*Primary Examiner* — Yaotang Wang
(74) *Attorney, Agent, or Firm* — Umberg Zipser LLP

(57) ABSTRACT

Embodiments of the present application provide a method and apparatus for bandwidth adjustment, an electronic device and a computer-readable storage medium. The method comprise obtaining an overload node; determining whether an overload bandwidth of the overload node is greater than a total available bandwidth amount of all target nodes for the overload node; if not, determining the overload node as a to-be-adjusted node and determining a to-be-adjusted bandwidth amount of the to-be-adjusted node based on the overloaded bandwidth of the overload node; decreasing a total carrying bandwidth amount of the to-be-adjusted node by the to-be-adjusted bandwidth amount corresponding to the to-be-adjusted node, and increasing a total target carrying bandwidth amount of the to-be-adjusted node by (Continued)

the to-be-adjusted bandwidth amount corresponding to the to-be-adjusted node. By applying the method provided by the embodiments of the present application, the bandwidth can be adjusted more accurately.

18 Claims, 8 Drawing Sheets

(51) Int. Cl.
*H04L 12/801* (2013.01)
*H04L 12/877* (2013.01)
*H04L 12/873* (2013.01)

(56) References Cited

U.S. PATENT DOCUMENTS

| | | | |
|---|---|---|---|
| 2014/0099954 A1* | 4/2014 | Choi | H04W 28/08 455/436 |
| 2017/0155596 A1 | 6/2017 | Jin et al. | |
| 2019/0179673 A1* | 6/2019 | Gray | G06F 9/505 |

FOREIGN PATENT DOCUMENTS

| | | |
|---|---|---|
| CN | 101232449 A | 7/2008 |
| CN | 101237391 A | 8/2008 |
| CN | 101771902 A | 7/2010 |
| CN | 102006217 A | 4/2011 |
| CN | 102123093 A | 7/2011 |
| CN | 103118134 A | 5/2013 |
| CN | 103560978 A | 2/2014 |

* cited by examiner

BANDWIDTH ADJUSTMENT METHOD AND APPARATUS, ELECTRONIC DEVICE, AND COMPUTER-READABLE STORAGE MEDIUM

The present application is based on, and claims the priority to a Chinese patent application No. 201810077039.1 filed with the China National Intellectual Property Administration on Jan. 26, 2018 and entitled "Bandwidth Adjustment Method and Apparatus, Electronic Device and Computer-Readable Storage Medium", which is incorporated herein by reference in its entirety.

TECHNICAL FIELD

The present application relates to the field of Internet technology, and in particular, to a method and apparatus for bandwidth adjustment, an electronic device, and a computer-readable storage medium.

BACKGROUND

The basic principle behind CDN (Content Delivery Network) is to avoid bottlenecks and links on Internet as much as possible that may affect the speed and stability of data transmission, to make content transmission faster and more stable. The CDN can redirect a user's request to a node closest to the user in real time based on comprehensive information such as a network traffic, a connection and load status of each node, a distance of each node to the user, and response time of each node and the like, by disposing an intelligent virtual network composed of CDN nodes (hereinafter referred to as nodes) on the existing Internet. The purpose is to enable the user to obtain the required content from the node closest to the user, solve the situation of Internet congestion, and improve the response speed when the user accesses to the Internet.

The basis for redirecting a user's request to a node closest to the user is to allocate a carrying bandwidth to each node in each scheduling unit so that the node can process the user's request. It should be noted that a link of a domain name is called a scheduling unit, that is, a scheduling unit is determined by a domain name and a link. The way to allocate carrying bandwidth to a node is to determine a ratio of carrying bandwidths of nodes in a scheduling unit, which is determined based on the number of virtual IP addresses of the nodes; and to allocate the total bandwidth carried by the scheduling unit to the nodes according to the determined ratio. For example, the scheduling unit 1 includes nodes A, B, and C, and five virtual IP addresses are assigned to each of the nodes A, B, and C in advance. The ratio of the carrying bandwidths of the nodes A, B, and C is 1:1:1. The total carrying bandwidth of the scheduling unit 1 is 60 G. Thus, the carrying bandwidth allocated to each of the nodes A, B, and C is 20 G.

In case a large number of user's requests are directed to a same node, the node will be overloaded. At this time, the carrying bandwidth of the overload node may be adjusted to prevent the overload node from failing due to heavy load. The way to adjust a carrying bandwidth of a node is to readjust the allocation ratio of the carrying bandwidths of the nodes and allocate the total bandwidth carried by the scheduling unit to the nodes according to the adjusted ratio. Specifically, a proportion of a carrying bandwidth of an overload node is decreased. After one of the virtual IP addresses of the overload node is removed, the allocation ratio of the carrying bandwidths of the nodes is determined, and then it is determined whether the difference between the carrying bandwidth currently allocated to the overload node and the carrying bandwidth previously allocated to the overload node is greater than an overload bandwidth of the overload node. If the difference is greater than the overload bandwidth of the overload node, the adjustment of the overload node ends; if the difference is less than or equal to the overload bandwidth of the overload node, then it is returned to the step of removing one of the virtual IP addresses of the overload node. For example, an amount of overload of the node A is 2 G. Since the carrying bandwidths of the nodes A, B, and C are determined based on the ratio of the number of virtual IP addresses of the nodes, it is not possible to decrease the carrying bandwidth of the node A in the scheduling unit 1 by 2 G and to increase the total carrying bandwidth of the nodes B and C in the scheduling unit 1 by 2 G. Instead, one virtual IP address of the node A is deleted, and the allocation ratio of the carrying bandwidths of the nodes A, B, and C are re-determined. The re-determined allocation ratio of the carrying bandwidths of the nodes A, B, and C is 4:5:5. At this time, the carrying bandwidth of the node A is 17.1 G, and the carrying bandwidth of each of the nodes B and C is 21.4 G. Thus, the carrying bandwidth of the node A is decreased by 2.9 G. It can be seen that the way to adjust the bandwidths based on the ratio determined by the number of virtual IP addresses will cause co-constraints between the carrying bandwidths of the nodes, resulting in a coarser adjustment granularity and thus inaccurate bandwidth adjustment.

SUMMARY

The objective of the embodiments of the present application is to provide a method and apparatus for bandwidth adjustment, an electronic device, and a computer-readable storage medium, to adjust the bandwidth accurately. Specific technical solutions are as follows.

In a first aspect, in order to achieve the foregoing objective, an embodiment of the present application provides a method for bandwidth adjustment, comprising: obtaining an overload node, wherein the overload node is a node whose total used bandwidth amount is greater than a preset first bandwidth threshold corresponding to the overload node; determining whether an overload bandwidth of the overload node is greater than a total current available bandwidth amount of a target node(s) for the overload node, wherein the overload bandwidth of the overload node is a difference between the total used bandwidth amount of the overload node and the preset first bandwidth threshold corresponding to the overload node; the target node(s) for the overload node is a node(s) whose total used bandwidth amount is less than the preset first bandwidth threshold corresponding to the overload node in all scheduling units including the overload node; when the overload bandwidth of the overload node is less than or equal to the total current available bandwidth amount of the target node(s) for the overload node, determining the overload node as a to-be-adjusted node and determining a to-be-adjusted bandwidth amount of the to-be-adjusted node; decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node, wherein the total target carrying bandwidth amount of the to-be-adjusted node is a sum of current carrying bandwidth(s) of the target node(s) for the to-beadjusted node; an increase carrying bandwidth amount of the target node(s) in a scheduling unit is less than or equal to an available bandwidth of the target node(s) in the scheduling unit, and the increase carrying bandwidth amount of the target node(s) in the scheduling unit is less than or equal to the to-be-adjusted bandwidth amount of the to-be-adjusted node.

In a second aspect, an embodiment of the present application provides an apparatus for bandwidth adjustment, comprising: an obtaining module configured for obtaining an overload node, wherein the overload node is a node whose total used bandwidth amount is greater than a preset first bandwidth threshold corresponding to the overload node; a first judging module, configured for determining whether an overload bandwidth of the overload node is greater than a total current available bandwidth amount of a target node(s) for the overload node, wherein the overload bandwidth of the overload node is a difference between the total used bandwidth amount of the overload node and the preset first bandwidth threshold corresponding to the overload node; the target node(s) for the overload node is a node(s) whose total used bandwidth amount is less than the preset first bandwidth threshold corresponding to the overload node in all scheduling units including the overload node; a determining module, configured for when the overload bandwidth of the overload node is less than or equal to the total current available bandwidth amount of the target node(s) for the overload node, determining the overload node as a to-be-adjusted node and determining a to-be-adjusted bandwidth amount of the to-be-adjusted node; a first adjusting module, configured for decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node, wherein the total target carrying bandwidth amount of the to-be-adjusted node is a sum of current carrying bandwidth(s) of the target node(s) for the to-be-adjusted node; an increase carrying bandwidth amount of the target node(s) in a scheduling unit is less than or equal to an available bandwidth of the target node(s) in the scheduling unit, and the increase carrying bandwidth amount of the target node(s) in the scheduling unit is less than or equal to the to-be-adjusted bandwidth amount of the to-be-adjusted node.

In a third aspect, in order to achieve the foregoing objective, an embodiment of the present application provides an electronic device comprising a processor and a memory, wherein the memory is configured to store a computer program; the processor is configured to execute the program stored in the memory to perform any one of the above methods for bandwidth adjustment.

In a fourth aspect, in order to achieve the foregoing objective, an embodiment of the present application provides a computer-readable storage medium storing a computer program thereon, wherein the computer program is executed by a processor so as to cause the processor to perform any one of the above methods for bandwidth adjustment.

In a fifth aspect, an embodiment of the present application provides a computer program product, which is executed on a computer so as to cause the computer to perform any one of the above methods for bandwidth adjustment.

In a sixth aspect, an embodiment of the present application provide a computer program, which is executed on a computer so as to cause the computer to perform any one of the above methods for bandwidth adjustment.

The method and apparatus for bandwidth adjustment, the electronic device and the computer-readable storage medium provided by the embodiments of the present application may determine the to-be-adjusted bandwidth amount of the overload node according to the overload bandwidth amount of the overload node; and when the overload bandwidth of the overload node is less than or equal to the total available bandwidth amount of the target nodes for the overload node, decrease the total carrying bandwidth amount of the overload node, and increase the sum of the carrying bandwidths of all target nodes. Compared with the case where the carrying bandwidths of the overload node and the target nodes need to be adjusted proportionally in the existing technologies, in the embodiments of the present application, the carrying bandwidths of the overload node and the target nodes may not be adjusted proportionally. Instead, the total carrying bandwidth amount of the overload node is decreased by the corresponding to-be-adjusted bandwidth amount, and the total carrying bandwidth amount of the target nodes is increased by the corresponding to-be-adjusted bandwidth amount. Therefore, bandwidth adjustment of the present application is more accurate compared with the existing technologies. Of course, any product or method of the present application does not necessarily achieve all the above advantages simultaneously.

BRIEF DESCRIPTION OF THE DRAWINGS

In order to more clearly describe the technical solutions of the embodiments of the present application or of the existing technologies, drawings that need to be used in embodiments and the existing technologies will be briefly described below. The drawings provided below are for only some embodiments of the present application; those skilled in the art can also obtain other drawings based on these drawings without any creative efforts.

DETAILED DESCRIPTION OF THE INVENTION

Figure 1:
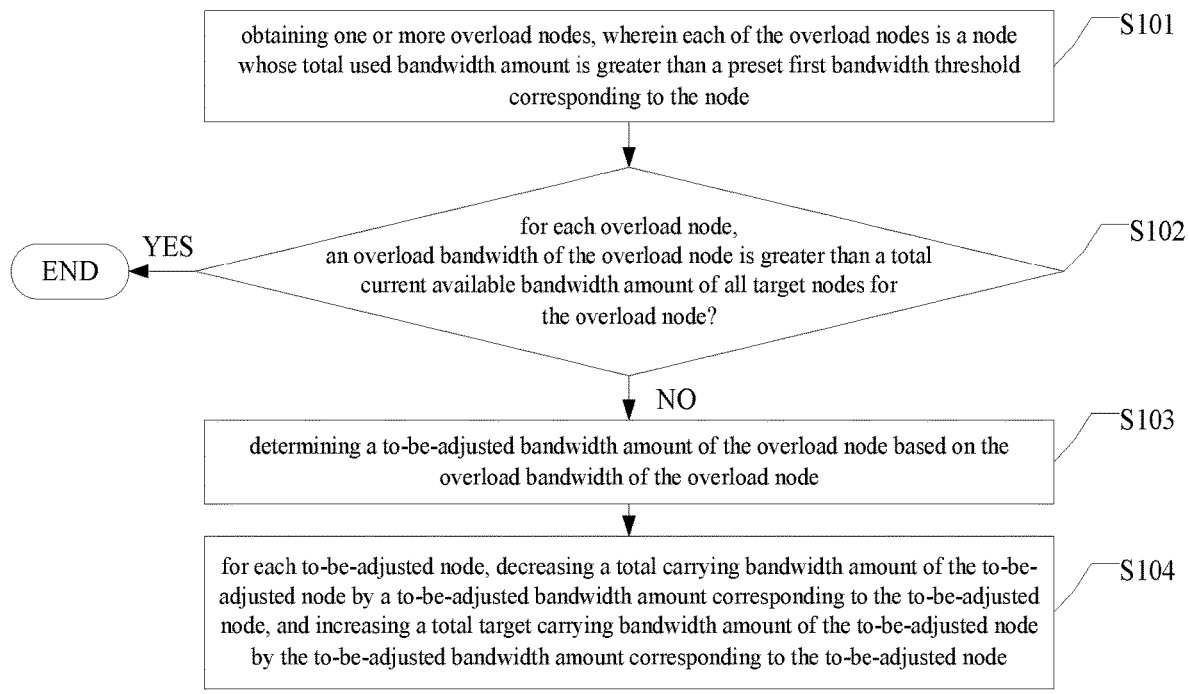
FIG. 1 is a first flowchart of a method for bandwidth adjustment according to an embodiment of the present application.

In order to make the objectives, technical solutions, and advantages of the present application clearer and more understandable, the present application will be described in more detail below with reference to the appended drawings and embodiments. The described embodiments are only some, and not all, of the embodiments of the present application. All other embodiments obtained based on the embodiments of the present application by those skilled in the art without any creative efforts fall into the scope of protection defined by the present application.

In order to solve the problem in the existing technologies, embodiments of the present application provide a method and apparatus for bandwidth adjustment, an electronic device, and a computer-readable storage medium. The method for bandwidth adjustment provided by an embodiment of the present application will be described below in detail.

In order to achieve accurate bandwidth adjustment, embodiments of the present application provide a method and apparatus for bandwidth adjustment, an electronic device and a computer-readable storage medium.

In a first aspect, a method for bandwidth adjustment provided by an embodiment of the present application is described in detail. The method for bandwidth adjustment may include the following steps A1-A4.

A1, obtaining an overload node, wherein the overload node is a node whose total used bandwidth amount is greater than a preset first bandwidth threshold corresponding to the overload node.

In a practical application, there may be one or more overload nodes. The number of overload nodes is not specifically limited in the embodiment of the present invention.

A2, determining whether an overload bandwidth of the overload node is greater than a total current available bandwidth amount of a target node(s) for the overload node, wherein the overload bandwidth of the overload node is a difference between the total used bandwidth amount of the overload node and the preset first bandwidth threshold corresponding to the overload node; the target node(s) for the overload node is a node(s) whose total used bandwidth amount is less than the preset first bandwidth threshold corresponding to the overload node in all scheduling units including the overload node.

A3, when the overload bandwidth of the overload node is less than or equal to the total current available bandwidth amount of the target node(s) for the overload node, determining the overload node as a to-be-adjusted node and determining a to-be-adjusted bandwidth amount of the to-be-adjusted node;

A4, decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node, wherein the total target carrying bandwidth amount of the to-be-adjusted node is a sum of current carrying bandwidth(s) of the target node(s) for the to-be-adjusted node; an increase carrying bandwidth amount of the target node(s) in a scheduling unit is less than or equal to an available bandwidth of the target node(s) in the scheduling unit, and the increase carrying bandwidth amount of the target node(s) in the scheduling unit is less than or equal to the to-be-adjusted bandwidth amount of the to-be-adjusted node.

In an implementation, the step of decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node comprises:

determining whether the to-be-adjusted node meets a target condition, wherein the target condition is that the overload bandwidth of the to-be-adjusted node is less than a first preset threshold corresponding to the to-be-adjusted node, and the total available bandwidth amount of the target node(s) for the to-be-adjusted node is greater than a second preset threshold corresponding to the to-be-adjusted node, wherein the second preset threshold is greater than the first preset threshold;

when the to-be-adjusted node meets the target condition, selecting one target scheduling unit whose total available bandwidth amount is greater than the to-be-adjusted bandwidth amount of the to-be-adjusted node from all target scheduling units as a first scheduling unit, wherein the target scheduling units are scheduling units including the to-be-adjusted node;

decreasing a carrying bandwidth of the to-be-adjusted node in the first scheduling unit by the to-be-adjusted bandwidth amount corresponding to the to-be-adjusted node; and increasing a total carrying bandwidth amount of the target node(s) in the first scheduling unit by the to-be-adjusted bandwidth amount corresponding to the to-be-adjusted node.

In an implementation, when the to-be-adjusted node does not meet the target condition, the step of decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node comprises:

determining whether there is only one target scheduling unit for the to-be-adjusted node;

when there is only one target scheduling unit for the to-be-adjusted node, decreasing the total carrying bandwidth amount of the to-be-adjusted node by the to-be-adjusted bandwidth amount corresponding to the to-be-adjusted node, and increasing the carrying bandwidth of the target node(s) in the target scheduling unit by a corresponding to-be-adjusted bandwidth;

when there are two or more target scheduling units of the to-be-adjusted node, calculating a first ratio of total available bandwidth amounts of all target scheduling units;

calculating an increase amount for each of the target scheduling units based on the calculated first ratio and the to-be-adjusted bandwidth amount of the to-be-adjusted node; and increasing a total carrying bandwidth amount of a target node(s) in each of the target scheduling units by an increase amount corresponding to this target scheduling unit, and decreasing a carrying bandwidth of the to-be-adjusted node in the target scheduling unit by the increase amount corresponding to this target scheduling unit.

In an implementation, the step of increasing a total carrying bandwidth amount of a target node(s) in each of the target scheduling units by an increase amount corresponding to this target scheduling unit, and decreasing a carrying bandwidth of the to-be-adjusted node in the target scheduling unit by the increase amount corresponding to this target scheduling unit comprises:

determining whether only one target node is included in the target scheduling unit;

when only one target node is included in the target scheduling unit, increasing the total carrying bandwidth amount of the target node in the target scheduling unit by the increase amount corresponding to this target scheduling unit and decreasing the carrying bandwidth of the to-be-adjusted node in the target scheduling unit by the increase amount corresponding to this target scheduling unit;

when two or more target nodes are included in the target scheduling unit, calculating a second ratio of available bandwidths of the target nodes in the target scheduling unit;

calculating an adjustment value for each target node in the target scheduling unit based on the calculated second ratio and the calculated increase amount for the target scheduling unit; and increasing the carrying bandwidth of each target node in the target scheduling unit by a to-be-adjusted bandwidth amount corresponding to this target node and decreasing the carrying bandwidth of the to-be-adjusted node in the target scheduling unit by the increase amount corresponding to the target scheduling unit.

In an implementation, the step of decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node comprises:

selecting a reference scheduling unit for the to-be-adjusted node from the scheduling units including the to-be-adjusted node by a greedy algorithm, decreasing the total carrying bandwidth amount of the to-be-adjusted node by the to-be-adjusted bandwidth amount corresponding to the to-be-adjusted node and increasing a total carrying bandwidth amount of the reference scheduling unit for the to-be-adjusted node by the to-be-adjusted bandwidth amount corresponding to the to-be-adjusted node.

In an implementation, the step of decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node comprises:

selecting one unselected target scheduling unit from all target scheduling units of the to-be-adjusted node as a second scheduling unit;

determining whether a total available bandwidth amount of a target node(s) in the second scheduling unit is greater than a remaining to-be-adjusted bandwidth amount of the to-be-adjusted node, wherein the remaining to-be-adjusted bandwidth amount of the to-be-adjusted node is a difference between the to-be-adjusted bandwidth amount of the to-be-adjusted node and an adjusted bandwidth amount of the to-be-adjusted node;

when the total available bandwidth amount of the target node(s) in the second scheduling unit is greater than the remaining to-be-adjusted bandwidth amount of the to-be-adjusted node, determining whether the remaining to-be-adjusted bandwidth amount of the to-be-adjusted node is greater than a carrying bandwidth of the to-be-adjusted node in the second scheduling unit;

when the remaining to-be-adjusted bandwidth amount of the to-be-adjusted node is less than or equal to the carrying bandwidth of the to-be-adjusted node in the second scheduling unit, increasing the total carrying bandwidth amount of the target node(s) in the second scheduling unit by the remaining to-be-adjusted bandwidth amount of the to-be-adjusted node and decreasing the carrying bandwidth of the to-be-adjusted node in the second scheduling unit by the remaining to-be-adjusted bandwidth amount of the to-be-adjusted node;

when the remaining to-be-adjusted bandwidth amount of the to-be-adjusted node is greater than the carrying bandwidth of the to-be-adjusted node in the second scheduling unit, increasing the total carrying bandwidth amount of the target node(s) in the second scheduling unit by a target value and decreasing the carrying bandwidth of the to-be-adjusted node in the second scheduling unit by the target value; and returning to perform the step of selecting one unselected target scheduling unit from all target scheduling units of the to-be-adjusted node as a second scheduling unit, until the remaining to-be-adjusted bandwidth amount of the to-be-adjusted node is zero, wherein the target value is determined based on the carrying bandwidth of the to-be-adjusted node in the second scheduling unit, and is less than or equal to the carrying bandwidth of the to-be-adjusted node in the second scheduling unit; and when the total available bandwidth amount of the target node(s) in the second scheduling unit is less than or equal to the remaining to-be-adjusted bandwidth amount of the to-be-adjusted node, increasing the total carrying bandwidth amount of the target node(s) in the second scheduling unit by the total available bandwidth amount of the target node(s) in the second scheduling unit and decreasing the carrying bandwidth of the to-be-adjusted node in the second scheduling unit by the total available bandwidth amount of the target node(s) in the second scheduling unit; and returning to perform the step of selecting one unselected target scheduling unit from all target scheduling units of the to-be-adjusted node as a second scheduling unit, until the remaining to-be-adjusted bandwidth amount of the to-be-adjusted node is zero.

In an implementation, the step of selecting one unselected target scheduling unit from all target scheduling units of the to-be-adjusted node as a second scheduling unit comprises:

selecting one target scheduling unit that is not currently selected and is at a foremost position in the target scheduling units ordered in a preset manner, as the second scheduling unit, wherein the preset manner indicates ordering the scheduling units in a descending order based on the total available bandwidth amounts of the target nodes and the used bandwidths of the to-be-adjusted node in the target scheduling units.

In an implementation, when the overload bandwidth of the overload node is greater than a total reference available bandwidth amount of the overload node, the method further comprises:

determining whether the overload bandwidth of the overload node is within a preset tolerance interval for the overload node, wherein the tolerance interval is determined by a preset second bandwidth threshold corresponding to the overload node and the preset first bandwidth threshold corresponding to the overload node;

when the overload bandwidth of the overload node is not within the preset tolerance interval for the overload node, determining whether a target bandwidth of the overload node is greater than the total available bandwidth amount of the target node(s) for the overload node, wherein the target bandwidth of the overload node is a difference between the total used bandwidth amount of the overload node and the preset second bandwidth threshold corresponding to the overload node; and when the target bandwidth of the overload node is greater than the total available bandwidth amount of the target node(s) for the overload node, decreasing the total carrying bandwidth amount of the target node(s) for the overload node in a third scheduling unit(s) by the target bandwidth, increasing a total carrying bandwidth amount of a reference node(s) in the third scheduling unit(s) by the target bandwidth, decreasing the total carrying bandwidth amount of the overload node in the target scheduling unit for the overload node by the target bandwidth, and increasing the total carrying bandwidth amount of the target node(s) for the overload node in the target scheduling unit by the target bandwidth, wherein the third scheduling unit(s) is a scheduling unit(s) that includes the target node(s) for the overload node, except for the target scheduling units including the overload node; the reference node(s) is a node(s) other than the target node(s) for the overload node and the overload node in the third scheduling unit(s).

For clarity, a method for bandwidth adjustment provided in the embodiment of the present application is described below with reference to FIGS. 1-7. For detailed description of the steps of the method for bandwidth adjustment provided in the foregoing embodiments of the present application, reference can be made to the description of corresponding steps in the embodiments corresponding to FIG. 1-7. A method for bandwidth adjustment provided in the embodiments of the present application is described below with reference to FIGS. 1-7.

FIG. 1 is a first flowchart of a method for bandwidth adjustment according to an embodiment of the present application. The method includes the following steps.

S101: obtaining one or more overload nodes, wherein each of the overload nodes is a node whose total used bandwidth amount is greater than a preset first bandwidth threshold corresponding to the node.

The node mentioned herein may be a CDN (Content Delivery Network) node. The total used bandwidth amount of a node is the sum of the used bandwidths of the node in all scheduling units including the node. The preset first bandwidth thresholds corresponding to different nodes may be the same or different. The preset first bandwidth threshold corresponding to a node may be calculated based on a carrying bandwidth of the node and a preset first used bandwidth ratio threshold of the node. For example, the carrying bandwidth of Node 1 is 10 G, and the first used bandwidth ratio threshold of Node 1 is 80%, then the preset first bandwidth threshold corresponding to Node 1 is 8 G. If the total used bandwidth amount of Node 1 is 9 G, then Node 1 is an overload node. If the total used bandwidth amount of Node 1 is 7 G, then Node 1 is not overloaded. The preset first bandwidth threshold corresponding to the node may also be a preset fixed value.

In the embodiment of the present application, a total used bandwidth amount of each node and a preset first bandwidth threshold corresponding to each node may be obtained first, and then it is determined whether each node is overloaded by comparing the total used bandwidth amount of the node with the preset first bandwidth threshold corresponding to the node. Specifically, if the total used bandwidth amount of a node is greater than the preset first bandwidth threshold corresponding to the node, the node is determined as an overload node. The preset first bandwidth threshold corresponding to each node may be stored in advance, or may be obtained in other ways. Of course, the overload nodes may also be obtained directly from other servers. For example, the overload nodes that may be obtained from other servers are Node 1, Node 2, Node 3, and so on.

In the embodiment of the present application, data such as the total used bandwidth amount of a node, the total available bandwidth amount of a node, and the total carrying bandwidth amount of a node can be obtained in the following ways.

Data refresh is initiated at a preset interval to obtain the data. Specifically, the data may be obtained from Central Control, Zabbix, and InfluxDB. The data obtained from Central Control, Zabbix, and InfluxDB is predetermined. For example, Zabbix stores the total used bandwidth amount of a node, and thus the total used bandwidth amount of the node may be obtained in advance from Zabbix. Zabbix is an enterprise-level open source solution that provides distributed system monitoring and network monitoring functions based on the WEB (World Wide Web) interface. InfluxDB is an open source time series, event, and index distributed database. In the process of data acquisition, it is possible to determine whether data acquisition is abnormal. If the data acquisition is abnormal, it indicates that to-be-acquired data has not been acquired. At this time, it is possible to continue acquiring the data. If the data acquisition fails again, then it is determined whether the to-be-acquired data is strong associated data, that is, it is determined whether the fact that the to-be-acquired data is not acquired will cause a subsequent bandwidth adjustment to be unachievable. If the fact that the to-be-acquired data is not acquired will cause the subsequent bandwidth adjustment to be unachievable, a warning message may be sent to the staff to troubleshoot timely. In addition, if data acquired by a terminal this time is not strong associated data, the data acquisition is continued. After there is no abnormality in the process of acquiring data, or after the data is acquired through retrying, the availability and accuracy of the acquired data is verified. The availability of the data may be verified according to the relationship between the data. The accuracy of the data may be verified based on empirical values. After verifying the availability and accuracy of the data, the verified data is stored in Rsdis and RDS (Relational Database Service). Redis is an open source, in-memory data structure server, which may be used as a database, a cache, and a message queue agent. In the process of bandwidth adjustment, data may be obtained from Rsdis or RDS.

S102: for each overload node, determining whether an overload bandwidth of the overload node is greater than a total current available bandwidth amount of all target nodes for the overload node, wherein the overload bandwidth of the overload node is a difference between the total used bandwidth amount of the overload node and the preset first bandwidth threshold corresponding to the overload node; the target nodes for the overload node are nodes whose total used bandwidth amount are less than the preset first bandwidth threshold corresponding to the nodes in all scheduling units including the overload node; if the overload bandwidth of the overload node is less than or equal to the total current available bandwidth amount of all target nodes for the overload node, performing step S103; if the overload bandwidth of the overload node is greater than the total current available bandwidth amount of all target nodes for the overload node, ending the process.

If it is determined that the overload bandwidth of the overload node is greater than the total current available bandwidth amount of all target nodes for the overload node, it is indicated that all target nodes for the overload node cannot currently carry the overload bandwidth of the overload node, and thus the carrying bandwidth of the overload node may not be adjusted at this time. Thus, the total carrying bandwidth amount of the overload node is no longer adjusted. If it is determined that the overload bandwidth of the overload node is less than or equal to the total current available bandwidth amount of all target nodes for the overload node, it is indicated that all target nodes for the overload node can currently carry the overload bandwidth of the overload node, and thus the carrying bandwidth of the overload node may be adjusted.

The overload bandwidth of the overload node may be understood as a portion of the total used bandwidth amount of the node exceeding the preset first bandwidth threshold corresponding to the node, that is, a difference between the total used bandwidth amount of the overload node and the preset first bandwidth threshold corresponding to the overload node. For example, if the total used bandwidth amount of Node 2 is 12 G, and the preset first bandwidth threshold corresponding to Node 2 is 10 G, the overload bandwidth of Node 2 is 2 G.

A scheduling unit is determined by a domain name and a link. A domain name is the name of a computer or group of computers on Internet composed of a series of characters separated by "dot". The purpose of a domain name is to facilitate the remembering and communication of the address of a group of servers. One link of one domain name is called one scheduling unit. For example, Nodes 1, 2, and 3 are nodes in Beijing Mobile Link, and all provide service for Beijing area with a domain name of Mobile. Nodes 1, 2, and 3 may be considered as one scheduling unit. Since one scheduling unit is determined by one domain name and one link, one scheduling unit may include one or more nodes. Different scheduling units may include a same node, but nodes included in the different scheduling units are not exactly the same.

The target node(s) for one overload node is a node(s) whose total used bandwidth amount is less than the preset first bandwidth threshold corresponding to the node(s) in all the scheduling units including the overload node. It can be understood that in nodes including in all the scheduling units including the overload node, a node(s) without overload is the target node(s) for the overload node. For example, the overload node is Node 1, and the scheduling unit in which Node 1 is located is Scheduling Unit A. The scheduling unit includes Node 1, Node 2, Node 3, and Node 4. Node 2 is also an overload node. Thus, the target nodes for Node 1 are Node 3 and Node 4. The scheduling units in which the overload node 2 is located are Scheduling Unit A and Scheduling Unit B. Scheduling Unit B includes Node 2, Node 3, and Node 5. The target nodes for Node 2 are Node 3, Node 4, and Node 6.

It should be noted that if the overload node is located only in one scheduling unit and there is only one node in the scheduling unit, then there is no target node for the overload node. If nodes included in all the scheduling units including the overload node are overload nodes, then there is no target node for the overload node. If there is no target node for an overload node, it is indicated that the carrying bandwidth of the overload node cannot be adjusted, and the subsequent steps are not performed.

The available bandwidth of the target node(s) may decrease with the adjustment of the carrying bandwidth of the overload node corresponding to the target node(s). The total available bandwidth amount of the target node(s) for one overload node will vary with the adjustment of the carrying bandwidth of the overload node in the scheduling unit where the target node(s) is located.

S103: determining a to-be-adjusted bandwidth amount of the overload node based on the overload bandwidth of the overload node.

When the overload bandwidth of one overload node is less than or equal to the total current available bandwidth amount of all target nodes for the overload node, it is indicated that all target nodes for the overload node can carry the overload bandwidth of the overload node.

In the embodiment of the present application, when the carrying bandwidth of the overload node is greater than or equal to the overload bandwidth of the overload node, the overload bandwidth of the overload node may be determined as the to-be-adjusted bandwidth amount of the overload node. In case the carrying bandwidth of the overload node is less than or equal to the total current available bandwidth amount of all target nodes for the overload node, a value is selected from a range of zero to the carrying bandwidth of the overload node as the to-be-adjusted bandwidth of the overload node. In case the carrying bandwidth of the overload node is greater than the total current available bandwidth amount of all target nodes for the overload node, a value is selected from a range of zero to the total current available bandwidth amount of all target nodes for the overload node as the to-be-adjusted bandwidth of the overload node. When the carrying bandwidth of the overload node is less than the overload bandwidth of the overload node, the carrying bandwidth of the overload node may be determined as the to-be-adjusted bandwidth amount of the overload node. Alternatively, a value may be selected from a range of zero to the carrying bandwidth of the overload node as the to-be-adjusted bandwidth of the overload node. For example, the overload node is Node 1, the carrying bandwidth of Node 1 is 10 G, the overload bandwidth of Node 1 is 1 G, and the total current available bandwidth amount of all target nodes for Node 1 is 5 G. Thus, the overload bandwidth of Node 1 may be determined as the to-be-adjusted bandwidth amount of Node 1; or a value may be selected from a range of 0-5 G as the to-be-adjusted bandwidth amount of Node 1.

S104: for each to-be-adjusted node, decreasing a total carrying bandwidth amount of the to-be-adjusted node by a to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node, wherein the to-be-adjusted node is an overload node whose overload bandwidth is less than or equal to the total available bandwidth amount of all target nodes for the overload node; the total target carrying bandwidth amount of the to-be-adjusted node is a sum of current carrying bandwidths of all target nodes for the to-be-adjusted node; an increase carrying bandwidth amount of one target node in one scheduling unit is less than or equal to an available bandwidth of the target node in the scheduling unit, and the increase carrying bandwidth amount of one target node in one scheduling unit is less than or equal to the to-be-adjusted bandwidth amount of the to-be-adjusted node.

If the overload bandwidth of one overload node is less than or equal to the total current available bandwidth amount of all target nodes for the overload node, the overload node may be called a to-be-adjusted node. The sum of current carrying bandwidths of all target nodes for one to-be-adjusted node is taken as the total target carrying bandwidth amount of the to-be-adjusted node. For example, the to-be-adjusted node is Node 2, and the target nodes for Node 2 are Node 3, Node 4, and Node 6. The current carrying bandwidth of Node 3 is 10 G, the current carrying bandwidth of Node 4 is 15 G, and the current carrying bandwidth of Node 6 is 12 G. Thus, the total target carrying bandwidth amount of Node 2 is 37 G. If the to-be-adjusted bandwidth of Node 2 is 2 G and the carrying bandwidth of Node 2 is 10 G, then the adjusted carrying bandwidth of Node 2 is 8 G, and the adjusted total target carrying bandwidth amount of Node 2 is 39 G.

One target node is allocated with a carrying bandwidth in each scheduling unit, and the available bandwidth of the target node in one scheduling unit is a difference between the carrying bandwidth allocated to the target node in the scheduling unit and the used bandwidth of the target node in the scheduling unit. For example, if the carrying bandwidth allocated to Node 3 in Scheduling Unit A is 5 G, and the used bandwidth of Node 3 in Scheduling Unit A is 4 G, the available bandwidth of Node 3 in Scheduling Unit A is 1 G. In order to avoid overload of the target node caused by the adjustment of the to-be-adjusted bandwidth, the increase carrying bandwidth amount of one target node in one scheduling unit is less than or equal to the available bandwidth of the target node in the scheduling unit. In this example, the increase carrying bandwidth amount of Node 3 in Scheduling Unit A is at most 1 G.

The principle of allocating requests based on the carrying bandwidth is that the larger the carrying bandwidth is, the more the allocated requests are. Decreasing the carrying bandwidth of an overload node can decrease subsequent requests allocated to the overload node and decrease the bandwidth used in processing these requests. Therefore, the load of the overload node in subsequent work can be decreased and the possibility of subsequent overloading of the overload node can be decreased.

If the overload bandwidth of one to-be-adjusted node is too large, a failure may occur and the user's request cannot be responded. Therefore, it is possible to adjust the carrying bandwidth of the to-be-adjusted node to avoid the failure due to too large overload bandwidth of the to-be-adjusted node. When there is more than one to-be-adjusted node, the carrying bandwidths of the to-be-adjusted nodes may be adjusted sequentially in order of overload bandwidths from big to small. The reason of the adjustment in order of overload bandwidths from big to small is that if the to-be-adjusted node with a smaller overload bandwidth is adjusted first, the carrying bandwidth of the to-be-adjusted node with a larger overload bandwidth may not be adjusted since the total available bandwidth amount of the target node(s) is less than the overload bandwidth, which results in failure of the overload node due to heavy load.

It should be noted that the bandwidth scheduling method provided in the embodiment of the present application may be set in IP (Internet Protocol) scheduling. IP scheduling is also called 302 scheduling, which is a traffic scheduling method in CDN. Compared to DNS (Domain Name System) scheduling, the 302 scheduling service in the IP scheduling performs 302 redirection on a client's request and forwards the client's request to a redirected node for processing.

The IP scheduling can obtain the client's IP address. The more refined scheduling can be performed based on the client's IP address. DNS scheduling is to perform scheduling based on local DNS addresses (providing caching and recursive service), which has a coarser scheduling granularity. Compared with IP scheduling, DNS scheduling also has the following disadvantages:

1. The client may set a wrong LocalDNS, which may cause a larger distance between a determined server processing a client's request and the client.

2. The operator's LocalDNS recurs according to the standard DNS protocol. However, because there are multiple exits on the network and a target route NAT (Network Address Translation) is configured, an IP address of an exit may not be an IP address of this network when the LocalDNS finally performs recursive parsing.

3. The operator's LocalDNS may perform parsing forwarding. The parsing forwarding refers to that the operator does not perform recursive domain name parsing, but forwards a domain name parsing request to recursive DNSs of other operators.

Bandwidth adjustment based on DNS scheduling is not precise enough, because of, on one hand, flow leads caused by regional specialization strategies of ISP (Internet Service Provider) and the specialization of DNS, and on the other hand, the limitation of the number of virtual IP addresses of each node of the DNS and the limitation of the number of virtual IP addresses for each scheduling unit. The above two factors result in that the bandwidth is only adjusted proportionally, which leads to a coarse adjustment granularity. With the method for bandwidth adjustment provided in the embodiment of the present application, the carrying bandwidths of the overload node and the target node(s) may not be adjusted proportionally. Specifically, the total carrying bandwidth amount of the overload node is decreased, and the total carrying bandwidth amount of the target node(s) is increased, which can make the bandwidth adjustment more accurate and more real-time.

The completion of bandwidth adjustment for all nodes may be understood as the generation of a traffic scheduling policy. The traffic scheduling policy may be used by the IP scheduling service. The IP scheduling service obtains personalized requirements of clients. The personalized requirements of clients may be the requirements for the response time of the request, the requirements for the response results, or the like. Then, specialized configurations are made based on the personalized requirements of clients. An optimal node is selected by the traffic scheduling strategy to provide service for the clients. In this way, the requirements of the clients can be met, better services are provided for users, and a greater flexibility than DNS scheduling services can be provided.

In the embodiment of the present application, the to-be-adjusted bandwidth amount of the overload node may be determined according to the overload bandwidth amount of the overload node. In case the overload bandwidth of the overload node is less than or equal to the total available bandwidth amount of the target nodes for the overload node, the total carrying bandwidth amount of the overload node is decreased, and the sum of the carrying bandwidths of all target nodes is increased. Compared with the case where the carrying bandwidths of the overload node and the target nodes need to be adjusted proportionally in the existing technologies, in the embodiments of the present application, the carrying bandwidths of the overload node and the target nodes may not be adjusted proportionally. Instead, the total carrying bandwidth amount of the overload node is decreased by a corresponding to-be-adjusted bandwidth amount, and the total carrying bandwidth amount of the target node is increased by the corresponding to-be-adjusted bandwidth amount. Therefore, bandwidth adjustment is more accurate compared with the existing technologies.

Figure 2:
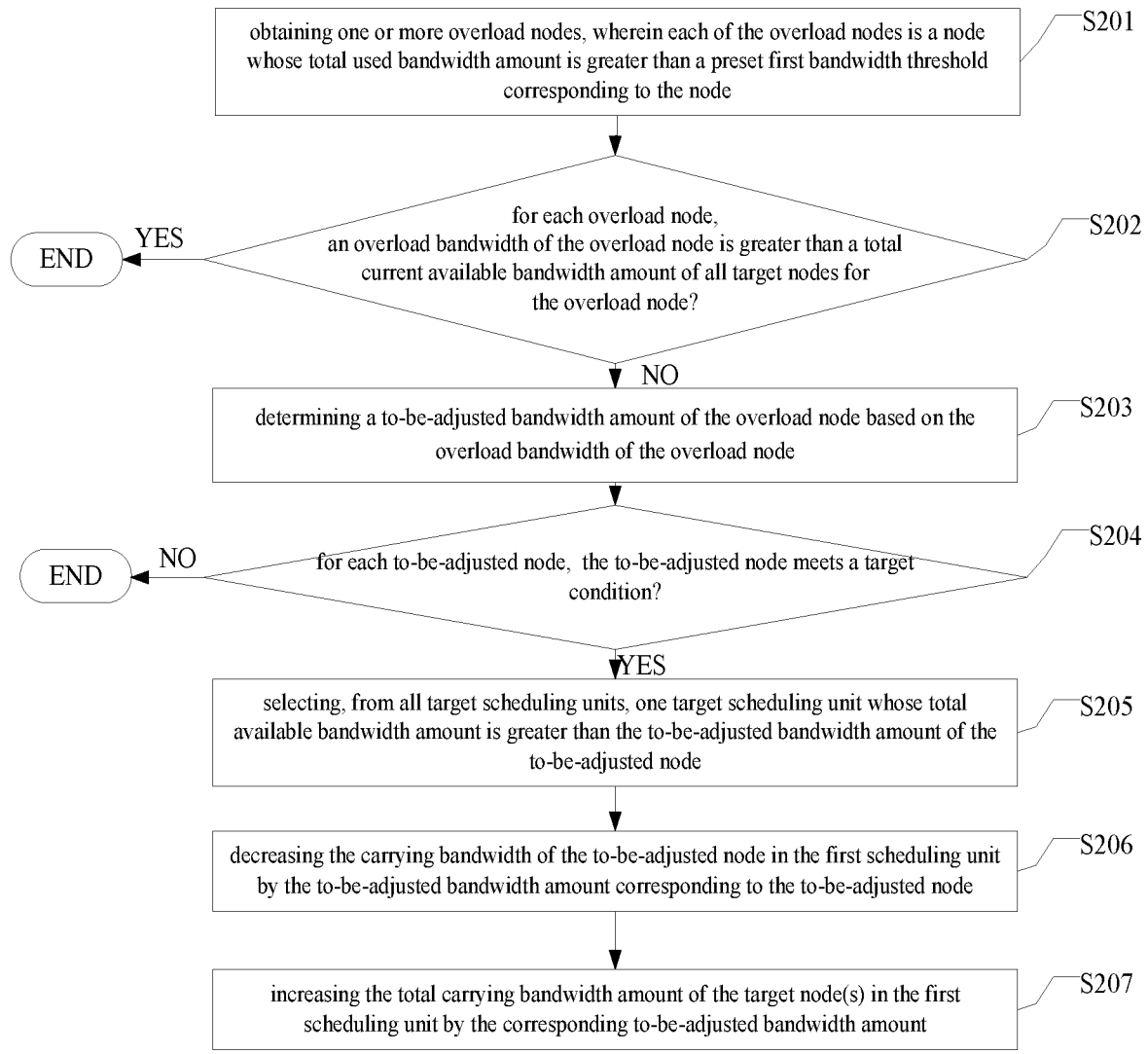
FIG. 2 is a second flowchart of a method for bandwidth adjustment according to an embodiment of the present application.

FIG. 2 is a second flowchart of a method for bandwidth adjustment according to an embodiment of the present application. The method includes the following steps.

S201: obtaining one or more overload nodes, wherein each of the overload nodes is a node whose total used bandwidth amount is greater than a preset first bandwidth threshold corresponding to the node.

S202: for each of the overload nodes, determining whether an overload bandwidth of the overload node is greater than a total current available bandwidth amount of all target nodes for the overload node, wherein the overload bandwidth of the overload node is a difference between the total used bandwidth amount of the overload node and the preset first bandwidth threshold corresponding to the overload node; the target nodes for the overload node are nodes whose total used bandwidth amount are less than the preset first bandwidth threshold in all scheduling units including the overload node; if the overload bandwidth of the overload node is less than or equal to the total current available bandwidth amount of all target nodes for the overload node, performing step S203; if the overload bandwidth of the overload node is greater than the total current available bandwidth amount of all target nodes for the overload node, ending the process.

S203: determining a to-be-adjusted bandwidth amount of the overload node based on the overload bandwidth of the overload node.

It should be noted that S201-S203 are the same as S101-S103 in the above embodiment, and will not be repeated here.

S204: for each to-be-adjusted node, determining whether the to-be-adjusted node meets a target condition, wherein the target condition is that the overload bandwidth of the to-be-adjusted node is less than a corresponding first preset threshold, and the total available bandwidth amount of all target nodes for the to-be-adjusted node is greater than a corresponding second preset threshold, wherein the second preset threshold is greater than the first preset threshold; if the to-be-adjusted node meets the target condition, performing step S205, and if the to-be-adjusted node does not meet the target condition, ending the process.

The first preset threshold mentioned herein may be determined in advance based on experience, and the second preset threshold may also be determined in advance based on experience. The second preset threshold is greater than the first preset threshold. The value of the first preset threshold and the value of the second preset threshold are not specifically limited in the embodiment of the present application.

The determining of whether one to-be-adjusted node meets the target condition includes first determining whether the overload bandwidth of the to-be-adjusted node is less than the first preset threshold; if the overload bandwidth of the to-be-adjusted node is greater than the first preset threshold, then determining whether the total available bandwidth amount of all target nodes for the to-be-adjusted node is greater than the second preset threshold; and if the total available bandwidth amount of all target nodes for the to-be-adjusted node is greater than the second preset threshold, determining that the to-be-adjusted node meets the target condition. The first preset thresholds corresponding to different nodes may be the same or different. In the case where a same node is overloaded again, in determining whether the to-be-adjusted node meets the target condition again, the first preset threshold used may be or may not be the same as the first preset threshold previously used. The second preset thresholds corresponding to different nodes may be the same or different. In the case where a same node is overloaded again, in determining whether the to-be-adjusted node meets the target conditions again, the second preset threshold used may be or may not be the same as the second preset threshold previously used. These are determined according to actual situations. If one to-be-adjusted node does not meet the target condition, it is indicated that S205 cannot be performed on the to-be-adjusted node. At this time, the total carrying bandwidth amount of the to-be-adjusted node may not be adjusted, that is, the adjustment of the total carrying bandwidth amount of the adjusted node is ended.

S205: selecting, from all target scheduling units, one target scheduling unit whose total available bandwidth amount is greater than the to-be-adjusted bandwidth amount of the to-be-adjusted node as a first scheduling unit, wherein the target scheduling units are scheduling units including the to-be-adjusted node and other nodes than the to-be-adjusted node.

The case that one to-be-adjusted node meets the target condition may be understood that the overload bandwidth of the to-be-adjusted node is relatively small and the total available bandwidth amount of all target nodes for the to-be-adjusted node is relatively large. At this time, the carrying bandwidth of the to-be-adjusted node may be decreased and the total target carrying bandwidth amount of the to-be-adjusted node may be increased, which has little effect on the total used bandwidth amount of all target nodes for the to-be-adjusted node. Therefore, one target scheduling unit whose total available bandwidth amount is greater than the to-be-adjusted bandwidth amount of the to-be-adjusted node may be selected from all target scheduling units as a first scheduling unit. In this way, a to-be-adjusted unit in which the to-be-adjusted node is adjustable may be determined conveniently and quickly, and the target scheduling unit may not be selected again, improving the efficiency of bandwidth adjustment.

If a scheduling unit includes only the to-be-adjusted node, then the carrying bandwidth of the to-be-adjusted node in the scheduling unit cannot be adjusted, and therefore, the scheduling unit cannot be used as a target scheduling unit. The target scheduling unit should be a scheduling unit that includes the to-be-adjusted node and other nodes than the to-be-adjusted node. For example, Scheduling Units A, B, and C all include Node 1, and Scheduling units A, B, and C include other nodes than Node 1. Therefore, Scheduling Units A, B, and C may be used as the target scheduling unit.

S206: decreasing the carrying bandwidth of the to-be-adjusted node in the first scheduling unit by the to-be-adjusted bandwidth amount corresponding to the to-be-adjusted node.

In the embodiment of the present application, the total available bandwidth amount corresponding to the selected first scheduling unit is greater than the overload bandwidth of the to-be-adjusted node, which indicates that the total available bandwidth amount of the target node(s) in the first scheduling unit can support the to-be-adjusted bandwidth amount of the to-be-adjusted node. Therefore, the carrying bandwidth of the to-be-adjusted unit in the first scheduling unit may be directly decreased by the corresponding to-be-adjusted bandwidth amount. It should be noted that the carrying bandwidth of the to-be-adjusted node in the first scheduling unit is greater than or equal to the to-be-adjusted bandwidth amount of the to-be-adjusted node. For example, the to-be-adjusted node is Node 2, and the scheduling units including Node 2 are Scheduling Units B, C, and D. The total available bandwidth amount of Scheduling Unit B is 10 G, the total available bandwidth amount of Scheduling Unit C is 8 G, the total available bandwidth amount of Scheduling Unit D is 6 G, and the to-be-adjusted bandwidth amount of Node 2 is 1 G. Scheduling Unit B is selected as the first scheduling unit for Node 2. The carrying bandwidth allocated to Node 2 in Scheduling Unit B is 5 G. Then the carrying bandwidth of Node 2 in Scheduling Unit B is decreased by 1 G, and the adjusted carrying bandwidth of Node 2 in Scheduling Unit B is 4 G.

S207: increasing the total carrying bandwidth amount of the target node(s) in the first scheduling unit by the corresponding to-be-adjusted bandwidth amount.

The total carrying bandwidth amount of the target node(s) in the first scheduling unit is increased by the corresponding to-be-adjusted bandwidth amount. In the case where there is only one target node in the first scheduling unit, the carrying bandwidth of the target node may be increased by the corresponding to-be-adjusted bandwidth amount. The to-be-adjusted bandwidth amount is the to-be-adjusted bandwidth amount corresponding to the to-be-adjusted node. In the case where there are two or more target nodes in the first scheduling unit, one target node whose available bandwidth in the first scheduling unit is greater than the to-be-adjusted bandwidth amount of the to-be-adjusted node may be selected, and then the carrying bandwidth of the selected target node is increased by the corresponding to-be-adjusted bandwidth. Alternatively, two or more target nodes in the first scheduling unit may be selected, and the increase amount corresponding to each target node may be determined. The sum of the increase amounts of the selected target nodes is the to-be-adjusted bandwidth amount. The carrying bandwidth of each selected target node is increased by the increase amount corresponding to this selected target node.

In the embodiment of the present application, the to-be-adjusted bandwidth amount of the overload node may be determined according to the overload bandwidth amount of the overload node. In the case where the overload bandwidth of the overload node is less than or equal to the total available bandwidth amount of the target nodes for the overload node, the total carrying bandwidth amount of the overload node is decreased, and the sum of the carrying bandwidths of all target nodes is increased. Compared with the case where the carrying bandwidths of the overload node and the target nodes need to be adjusted proportionally in the existing technologies, in the embodiments of the present application, the carrying bandwidths of the overload node and the target nodes may not be adjusted proportionally, but the total carrying bandwidth amount of the overload node is decreased by the corresponding to-be-adjusted bandwidth amount, and the total carrying bandwidth amount of the target nodes is increased by the corresponding to-be-adjusted bandwidth amount. When the overload node meets the target condition, one scheduling unit is directly selected, the carrying bandwidth of the overload node is decreased by the corresponding to-be-adjusted bandwidth amount, and the total carrying bandwidth amount of the target node(s) for the selected scheduling unit is increased by the corresponding to-be-adjusted bandwidth amount. In this way, not only can the bandwidth adjustment be made more precise, but also the to-be-adjusted unit in which the to-be-adjusted node is adjustable can be determined more conveniently and quickly, which can improve the efficiency of bandwidth adjustment.

Figure 3:
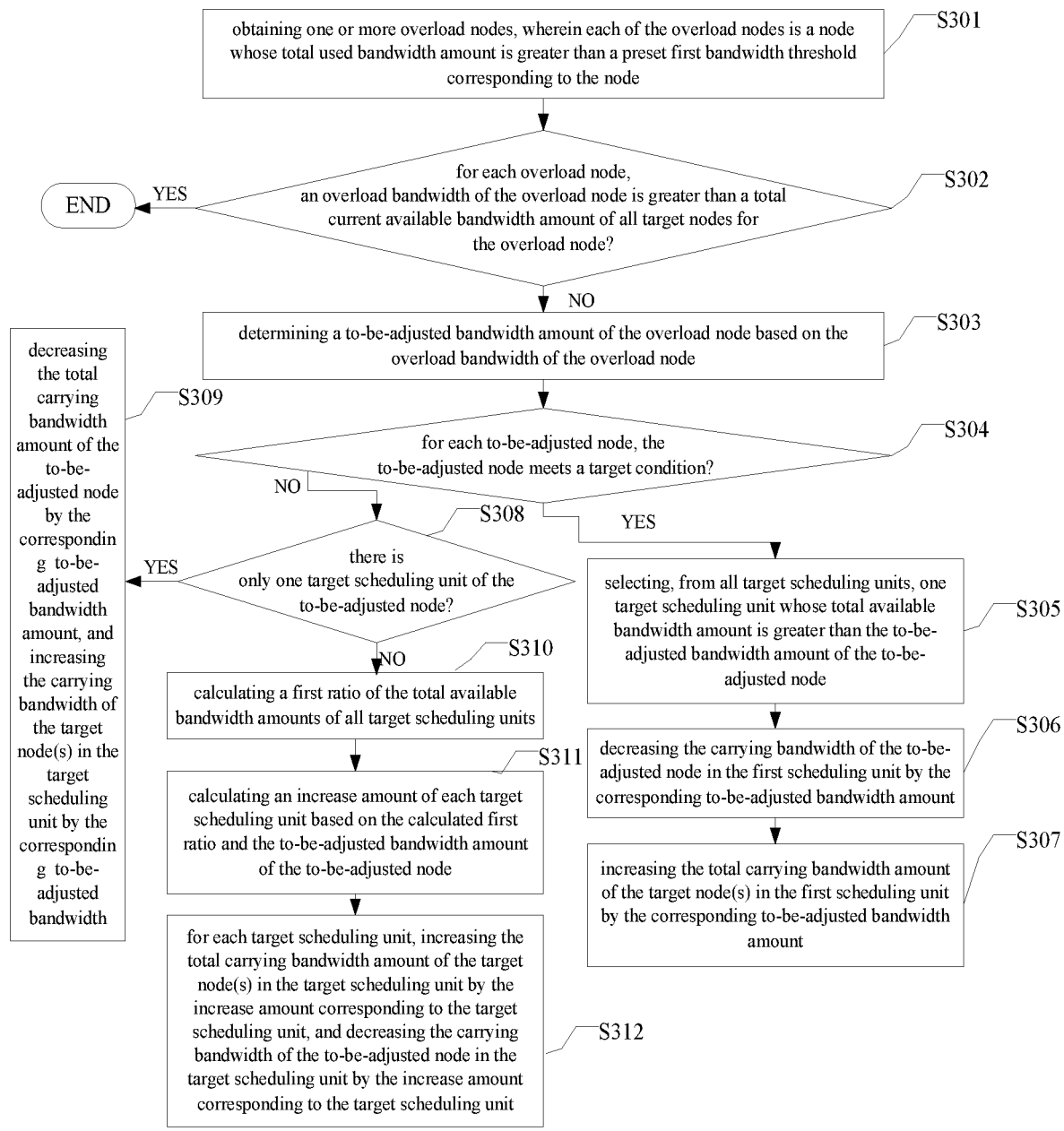
FIG. 3 is a third flowchart of a method for bandwidth adjustment according to an embodiment of the present application.

FIG. 3 is a third flowchart of a method for bandwidth adjustment according to an embodiment of the present application. The method includes the following steps.

S301: obtaining one or more overload nodes, wherein each of the overload nodes is a node whose total used bandwidth amount is greater than a preset first bandwidth threshold corresponding to the node.

S302: for each of the overload nodes, determining whether an overload bandwidth of the overload node is greater than a total current available bandwidth amount of all target nodes for the overload node, wherein the overload bandwidth of the overload node is a difference between the total used bandwidth amount of the overload node and the preset first bandwidth threshold corresponding to the overload node; the target nodes for the overload node are nodes whose total used bandwidth amount are less than the preset first bandwidth threshold corresponding to the nodes in all scheduling units including the overload node; if the overload bandwidth of the overload node is less than or equal to the total current available bandwidth amount of all target nodes for the overload node, performing step S303; if the overload bandwidth of the overload node is greater than the total current available bandwidth amount of all target nodes for the overload node, ending the process.

S303: determining a to-be-adjusted bandwidth amount of the overload node based on the overload bandwidth of the overload node.

S304: for each to-be-adjusted node, determining whether the to-be-adjusted node meets a target condition; if the to-be-adjusted node meets the target condition, performing step S305, and if the to-be-adjusted node does not meet the target condition, performing step S308; wherein the target condition is that the overload bandwidth of the to-be-adjusted node is less than a corresponding first preset threshold, and the total available bandwidth amount of all target nodes for the to-be-adjusted node is greater than a corresponding second preset threshold, wherein the second preset threshold is greater than the first preset threshold.

S305: selecting, from all target scheduling units, one target scheduling unit whose total available bandwidth amount is greater than the to-be-adjusted bandwidth amount of the to-be-adjusted node as a first scheduling unit, wherein the target scheduling units are a scheduling units including the to-be-adjusted node.

S306: decreasing the carrying bandwidth of the to-be-adjusted node in the first scheduling unit by the to-be-adjusted bandwidth amount corresponding to the to-be-adjusted node.

S307: increasing the total carrying bandwidth amount of the target node(s) in the first scheduling unit by the to-be-adjusted bandwidth amount corresponding to the to-be-adjusted node.

It should be noted that S301-S303 are the same as S101-S103 in the above embodiment, respectively, and S304-S307 are the same as S204-S207 in the above embodiment, respectively. Thus, they will not be repeated here.

S308: determining whether there is only one target scheduling unit for the to-be-adjusted node; if there is only one target scheduling unit for the to-be-adjusted node, performing step S309; if there is more than one target scheduling unit for the to-be-adjusted node, performing step S310.

S309: decreasing the total carrying bandwidth amount of the to-be-adjusted node by the to-be-adjusted bandwidth amount corresponding to the to-be-adjusted node, and increasing the carrying bandwidth of the target node(s) in the target scheduling unit by the to-be-adjusted bandwidth corresponding to the to-be-adjusted node.

Once the target scheduling unit(s) of the to-be-adjusted node is determined, the number of target scheduling units of the to-be-adjusted node is determined. If there is only one target scheduling unit, the carrying bandwidth of the to-be-adjusted node in the target scheduling unit may be decreased by the to-be-adjusted bandwidth amount corresponding to the to-be-adjusted node, and the carrying bandwidth of the target node(s) in the target scheduling unit is increased by the to-be-adjusted bandwidth corresponding to the to-be-adjusted node.

S310: calculating a first ratio of total available bandwidth amounts of all target scheduling units.

When there is more than one target scheduling unit for the to-be-adjusted node, a first ratio of the total available amounts of the target scheduling units may be calculated. For example, Scheduling Units A, B, and C are the target scheduling units of Node 1. The total available bandwidth amount of Scheduling Unit A is 4 G, the total available bandwidth amount of Scheduling Unit B is 4 G, and the total available bandwidth amount of Scheduling Unit C is 2 G. Then the first ratio of the total available bandwidth amounts of the determined target scheduling units is 2:2:1.

S311: calculating an increase amount of each target scheduling unit based on the calculated first ratio and the to-be-adjusted bandwidth amount of the to-be-adjusted node.

Continuing the example given in S310, if the to-be-adjusted bandwidth amount of Node 1 is 1G (here, 1 G=1000M is taken as an example for description), then the increase amount of Scheduling Unit A is 400M, and the increase amount of Scheduling Unit B is 400M, the increase amount of Scheduling Unit C is 200M.

S312: for each target scheduling unit, increasing the total carrying bandwidth amount of the target node(s) in the target scheduling unit by the increase amount corresponding to the target scheduling unit, and decreasing the carrying bandwidth of the to-be-adjusted node in the target scheduling unit by the increase amount corresponding to the target scheduling unit.

Continuing the example given in S310, the total carrying bandwidth amount of the target node(s) in Scheduling Unit A is increased by 400M, and the carrying bandwidth of Node 1 in Scheduling Unit A is decreased by 400M. The total carrying bandwidth amount of the target node(s) in Scheduling Unit B is increased by 400M, and the carrying bandwidth of Node 1 in Scheduling Unit B is decreased by 400M. The total carrying bandwidth amount of the target node(s) in Scheduling Unit C is increased by 200M, and the carrying bandwidth of Node 1 in Scheduling Unit C is decreased by 200M.

In the embodiment of the present application, the to-be-adjusted bandwidth amount of the overload node may be determined according to the overload bandwidth amount of the overload node. In the case where the overload bandwidth of the overload node is less than or equal to the total available bandwidth amount of the target nodes for the overload node, the total carrying bandwidth amount of the overload node is decreased, and the sum of the carrying bandwidths of all target nodes is increased. Compared with the case where the carrying bandwidths of the overload node and the target nodes need to be adjusted proportionally in the existing technologies, in the embodiments of the present application, the ratio of the total available bandwidth amounts of the target nodes can reflect proportional relationship between the target nodes more accurately. Through the ratio of the total available bandwidth amounts of the target nodes, the increase amount of the target nodes in the target scheduling units can be determined, which can decrease the error of bandwidth adjustment and realize more fine bandwidth adjustment.

Figure 4:
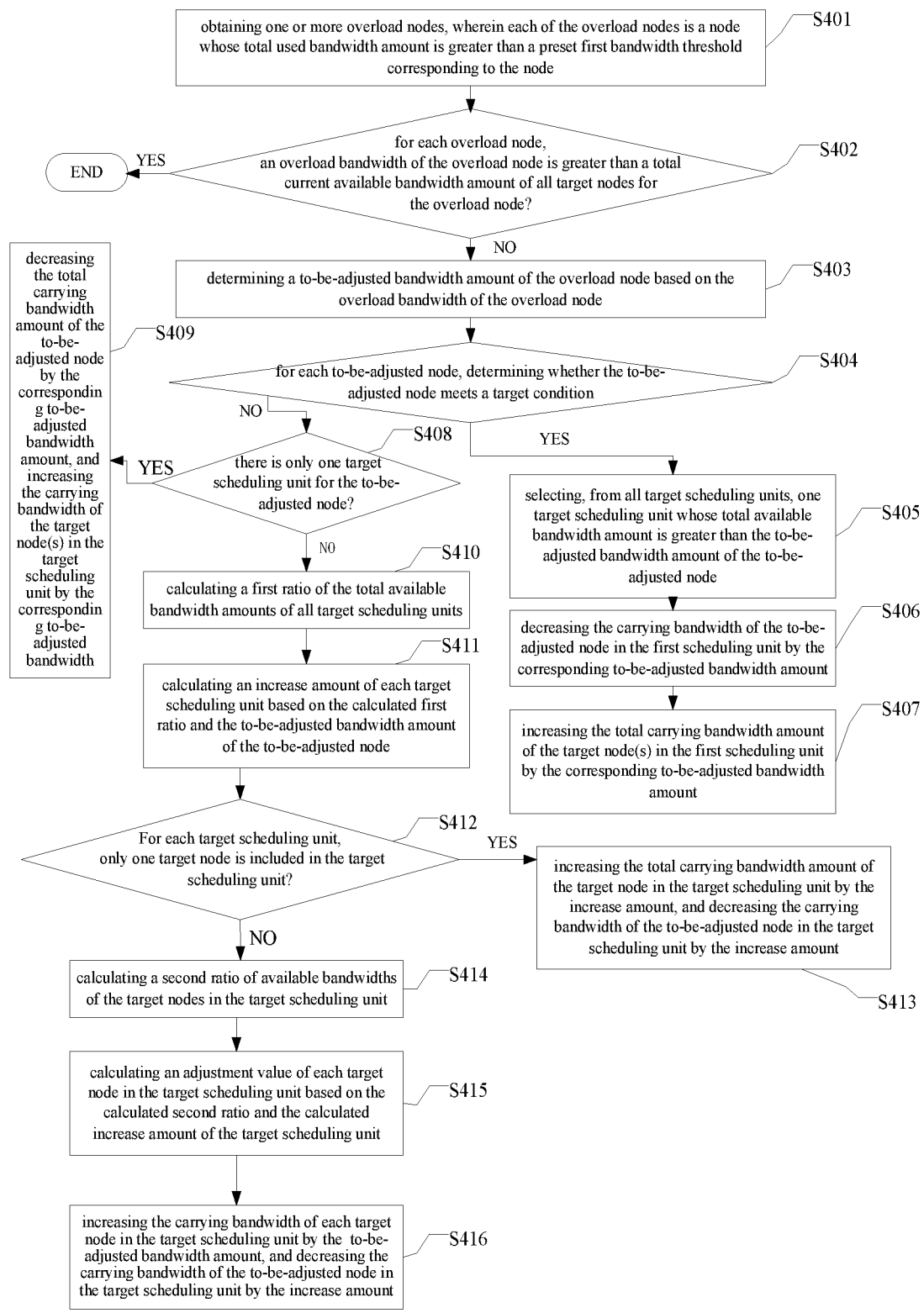
FIG. 4 is a fourth flowchart of a method for bandwidth adjustment according to an embodiment of the present application.

FIG. 4 is a fourth flowchart of a method for bandwidth adjustment according to an embodiment of the present application. The method includes the following steps.

S401: obtaining one or more overload nodes, wherein each of the overload nodes is a node whose total used bandwidth amount is greater than a preset first bandwidth threshold corresponding to the node.

S402: for each of the overload nodes, determining whether an overload bandwidth of the overload node is greater than a total current available bandwidth amount of all target nodes for the overload node, wherein the overload bandwidth of the overload node is a difference between the total used bandwidth amount of the overload node and the preset first bandwidth threshold corresponding to the overload node; the target nodes for the overload node are nodes whose total used bandwidth amount are less than the preset first bandwidth threshold corresponding to the nodes in all scheduling units including the overload node; if the overload bandwidth of the overload node is less than or equal to the total current available bandwidth amount of all target nodes for the overload node, performing step S403; if the overload bandwidth of the overload node is greater than the total current available bandwidth amount of all target nodes for the overload node, ending the process.

S403: determining a to-be-adjusted bandwidth amount of the overload node based on the overload bandwidth of the overload node.

S404: for each to-be-adjusted node, determining whether the to-be-adjusted node meets a target condition; if the to-be-adjusted node meets the target condition, performing step S405, and if the to-be-adjusted node does not meet the target condition, performing step S408; wherein the target condition is that the overload bandwidth of the to-be-adjusted node is less than a corresponding first preset threshold, and the total available bandwidth amount of all target nodes for the to-be-adjusted node is greater than a corresponding second preset threshold, wherein the second preset threshold is greater than the first preset threshold.

S405: selecting, from all target scheduling units, one target scheduling unit whose total available bandwidth amount is greater than the to-be-adjusted bandwidth amount of the to-be-adjusted node as a first scheduling unit, wherein the target scheduling units are scheduling units including the to-be-adjusted node.

S406: decreasing the carrying bandwidth of the to-be-adjusted node in the first scheduling unit by the to-be-adjusted bandwidth amount corresponding to the first scheduling unit.

S407: increasing the total carrying bandwidth amount of the target node(s) in the first scheduling unit by the to-be-adjusted bandwidth amount corresponding to the first scheduling unit.

S408: determining whether there is only one target scheduling unit for the to-be-adjusted node; if there is only one target scheduling unit for the to-be-adjusted node, performing step S409; if there is more than one target scheduling unit for the to-be-adjusted node, performing step S410.

S409: decreasing the total carrying bandwidth amount of the to-be-adjusted node by the to-be-adjusted bandwidth amount corresponding to the to-be-adjusted node, and increasing the carrying bandwidth of the target node(s) in the target scheduling unit by the to-be-adjusted bandwidth corresponding to the to-be-adjusted node;

S410: calculating a first ratio of total available bandwidth amounts of all target scheduling units.

S411: calculating an increase amount of each target scheduling unit based on the calculated first ratio and the to-be-adjusted bandwidth amount of the to-be-adjusted node.

It should be noted that S401-S403 are the same as S101-S103 in the above embodiment, respectively, and S404-S407 are the same as S204-S207 in the above embodiment, respectively, and S405-S411 are the same as S305-S311 in the above embodiment, respectively. Thus, they will not be repeated here.

S412: for each target scheduling unit, determining whether only one target node is included in the target scheduling unit; if only one target node is included in the target scheduling unit, performing step S413, if more than one target node is included in the target scheduling unit, performing step S414.

S413: increasing the total carrying bandwidth amount of the target node in the target scheduling unit by the increase amount corresponding to the target scheduling unit, and decreasing the carrying bandwidth of the to-be-adjusted node in the target scheduling unit by the increase amount corresponding to the target scheduling unit.

When one target scheduling unit includes one target node, the calculated increase amount of the target scheduling unit cannot be allocated to different target nodes, and therefore only the carrying bandwidth of the target node can be increased by the increase amount.

S414: calculating a second ratio of available bandwidths of the target nodes in the target scheduling unit.

In the case where there are two or more target nodes in one target scheduling unit, the increase amount corresponding to the target scheduling unit is allocated to these target nodes, so that the bandwidth adjustment is more balanced, thus decreasing the possibility of overloading the target node due to unbalanced adjustment of the carrying bandwidth.

The second ratio is a ratio of the carrying bandwidths of the target nodes. For example, Scheduling Unit A is a target scheduling unit, and the target nodes included in Scheduling Unit A are Node 3 and Node 4. The available bandwidth of Node 3 is 1G, and the available bandwidth of Node 4 is 3G. Thus, the second ratio is 1:3.

S415: calculating an adjustment value of each target node in the target scheduling unit based on the calculated second ratio and the calculated increase amount of the target scheduling unit.

Continuing the example in S414, if the increase amount of Scheduling Unit A is 400M, the calculated adjustment value of Node 3 is 100M, and the adjustment value of Node 4 is 300M.

S416: increasing the carrying bandwidth of each target node in the target scheduling unit by a to-be-adjusted bandwidth amount corresponding to the target node, and decreasing the carrying bandwidth of the to-be-adjusted node in the target scheduling unit by the increase amount corresponding to the target scheduling unit.

Continuing the example in S414, the carrying bandwidth of Node 3 in Scheduling Unit A is increased by 100M, the carrying bandwidth of Node 4 in Scheduling Unit A is increased by 300M, and the carrying bandwidth of Node 1 in Scheduling Unit A is decreased by 400M.

In the embodiment of the present application, in the case where the overload bandwidth of the overload node is less than or equal to the total available bandwidth amount of the target nodes for the overload node, if the number of target scheduling units is different, the method for adjusting the bandwidth of the to-be-adjusted node is different; and if the number of target nodes is different, the method for adjusting the bandwidth of the to-be-adjusted node is also different. Compared with the case where the carrying bandwidths of the overload node and the target node(s) need to be adjusted proportionally in the existing technologies, in the embodiments of the present application, the adjustment method of the to-be-adjusted node and the increase value of the carrying bandwidth of the target node are determined flexibly according to actual situations. Therefore, compared to the existing technologies, the bandwidth can be adjusted more finely by the present application.

Figure 5:
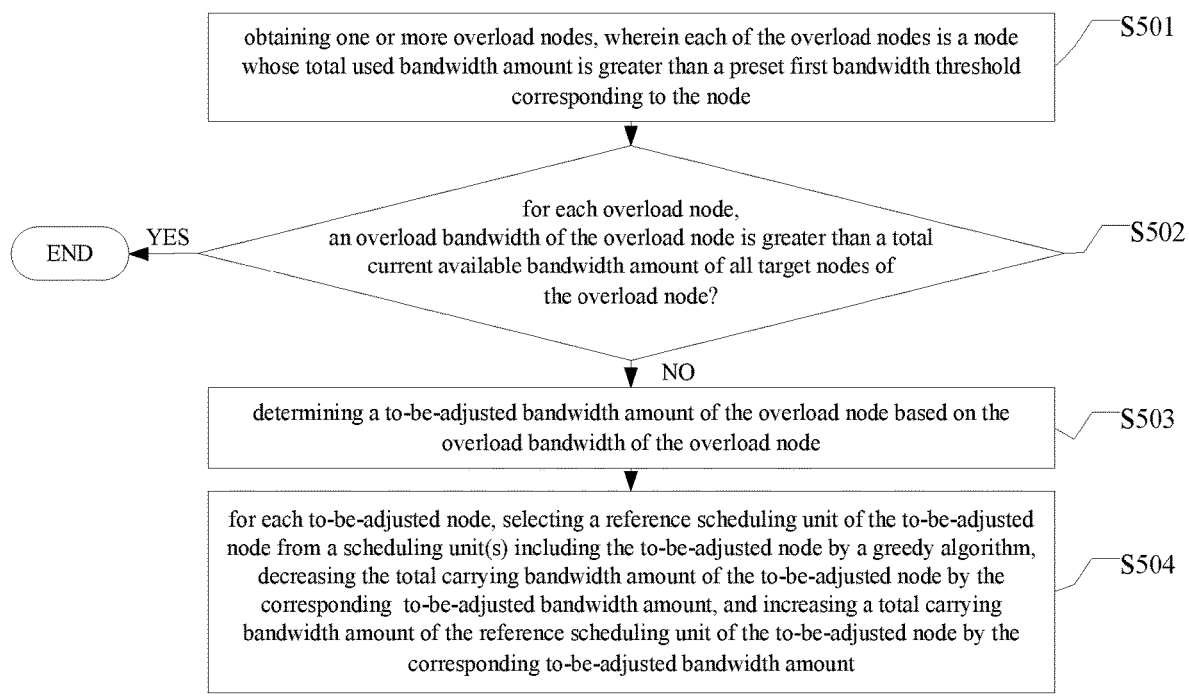
FIG. 5 is a fifth flowchart of a method for bandwidth adjustment according to an embodiment of the present application.

FIG. 5 is a fifth flowchart of a method for bandwidth adjustment according to an embodiment of the present application. The method includes the following steps.

S501: obtaining one or more overload nodes, wherein each of the overload nodes is a node whose total used bandwidth amount is greater than a preset first bandwidth threshold corresponding to the node.

S502: for each of the overload nodes, determining whether an overload bandwidth of the overload node is greater than a total current available bandwidth amount of all target nodes for the overload node, wherein the overload bandwidth of the overload node is a difference between the total used bandwidth amount of the overload node and the preset first bandwidth threshold corresponding to the overload node; the target nodes for the overload node is nodes whose total used bandwidth amount are less than the preset first bandwidth threshold corresponding to the nodes in all scheduling units including the overload node; if the overload bandwidth of the overload node is less than or equal to the total current available bandwidth amount of all target nodes for the overload node, performing step S503; if the overload bandwidth of the overload node is greater than the total current available bandwidth amount of all target nodes for the overload node, ending the process.

S503: determining a to-be-adjusted bandwidth amount of the overload node based on the overload bandwidth of the overload node.

S504: for each to-be-adjusted node, selecting a reference scheduling unit for the to-be-adjusted node from a scheduling unit(s) including the to-be-adjusted node by using a greedy algorithm, and decreasing the total carrying bandwidth amount of the to-be-adjusted node by the to-be-adjusted bandwidth amount corresponding to the to-be-adjusted node, and increasing a total carrying bandwidth amount of the reference scheduling unit for the to-be-adjusted node by the to-be-adjusted bandwidth amount corresponding to the to-be-adjusted node.

The greedy algorithm refers to making a locally optimal choice at each stage in problem-solving. In other words, it provides a locally optimal solution to some extent without providing a global optimum. In the embodiment of the present application, the greedy algorithm is mainly configured to select a reference scheduling unit for the to-be-adjusted node after obtaining information such as the to-be-adjusted bandwidth of the to-be-adjusted node, the used bandwidth of the target node(s) in the scheduling unit, the available bandwidth of the target node(s) in the target scheduling unit, the carrying bandwidth of the target node(s) in the scheduling unit and the carrying bandwidth of the to-be-adjusted node in the scheduling unit, or the like. The reference scheduling unit selected by the greedy algorithm is a local optimal solution, rather than an overall optimal solution of selecting a reference scheduling unit. This can quickly determine the reference scheduling unit corresponding to the to-be-adjusted node, improving the efficiency of bandwidth adjustment.

For one to-be-adjusted node, if there is only one reference scheduling unit, the carrying bandwidth of the to-be-adjusted node in the reference scheduling unit is decreased by the to-be-adjusted bandwidth amount corresponding to the to-be-adjusted node, and the total carrying bandwidth amount of the target node(s) in the reference scheduling unit is increased by the to-be-adjusted bandwidth amount corresponding to the to-be-adjusted node. Specifically, in the case where there is only one target node in the reference scheduling unit, the carrying bandwidth of the target node in the reference scheduling unit is increased by the to-be-adjusted bandwidth amount corresponding to the to-be-adjusted node. In the case where there are two or more target nodes in the reference scheduling unit, a bandwidth adjustment amount of each target node is determined, and a carrying bandwidth of each target node in the reference scheduling unit is adjusted by the bandwidth adjustment amount corresponding to the target node. The bandwidth adjustment amount of each target node may be determined by the greedy algorithm in selecting a reference bandwidth by the greedy algorithm. It may also be determined in other ways.

For one to-be-adjusted node, in the case where there is more than one reference scheduling unit, a bandwidth adjustment amount of each reference scheduling unit is determined; the carrying bandwidth of the to-be-adjusted node in each reference scheduling unit is adjusted by the bandwidth adjustment amount corresponding to the reference scheduling unit; and the total carrying bandwidth amount of the target node(s) in each reference scheduling unit is increased by the bandwidth adjustment amount corresponding to the reference scheduling unit. Specifically, for the adjustment of the carrying bandwidth of the target node(s) in the reference scheduling unit, a reference may be made to the foregoing method for adjusting the carrying bandwidth of the target node(s) in the case where there is only one reference scheduling unit, which is not described herein again.

In the embodiment of the present application, in the case where the overload bandwidth of the overload node is greater than the total available bandwidth amount of the target nodes for the overload node, a reference scheduling unit for the to-be-adjusted node is determined by a greedy algorithm; the carrying bandwidth of the to-be-adjusted node in the reference scheduling is decreased, and the total carrying bandwidth amount of the target node(s) in the reference scheduling unit is increased. Compared with the case where the carrying bandwidths of the overload node and the target node(s) need to be adjusted proportionally in the existing technologies, in the embodiments of the present application, the carrying bandwidths of the overload node and the target node(s) may not be adjusted proportionally. Instead, the carrying bandwidth of the to-be-adjusted node in the reference scheduling unit is decreased, and the total carrying bandwidth amount of the target node(s) in the reference scheduling unit is increased. In this way, the bandwidth adjustment is finer. In addition, by selecting a reference scheduling unit with a greedy algorithm, a scheduling unit that is to be adjusted can be quickly determined, thereby improving the efficiency of bandwidth adjustment.

Figure 6:
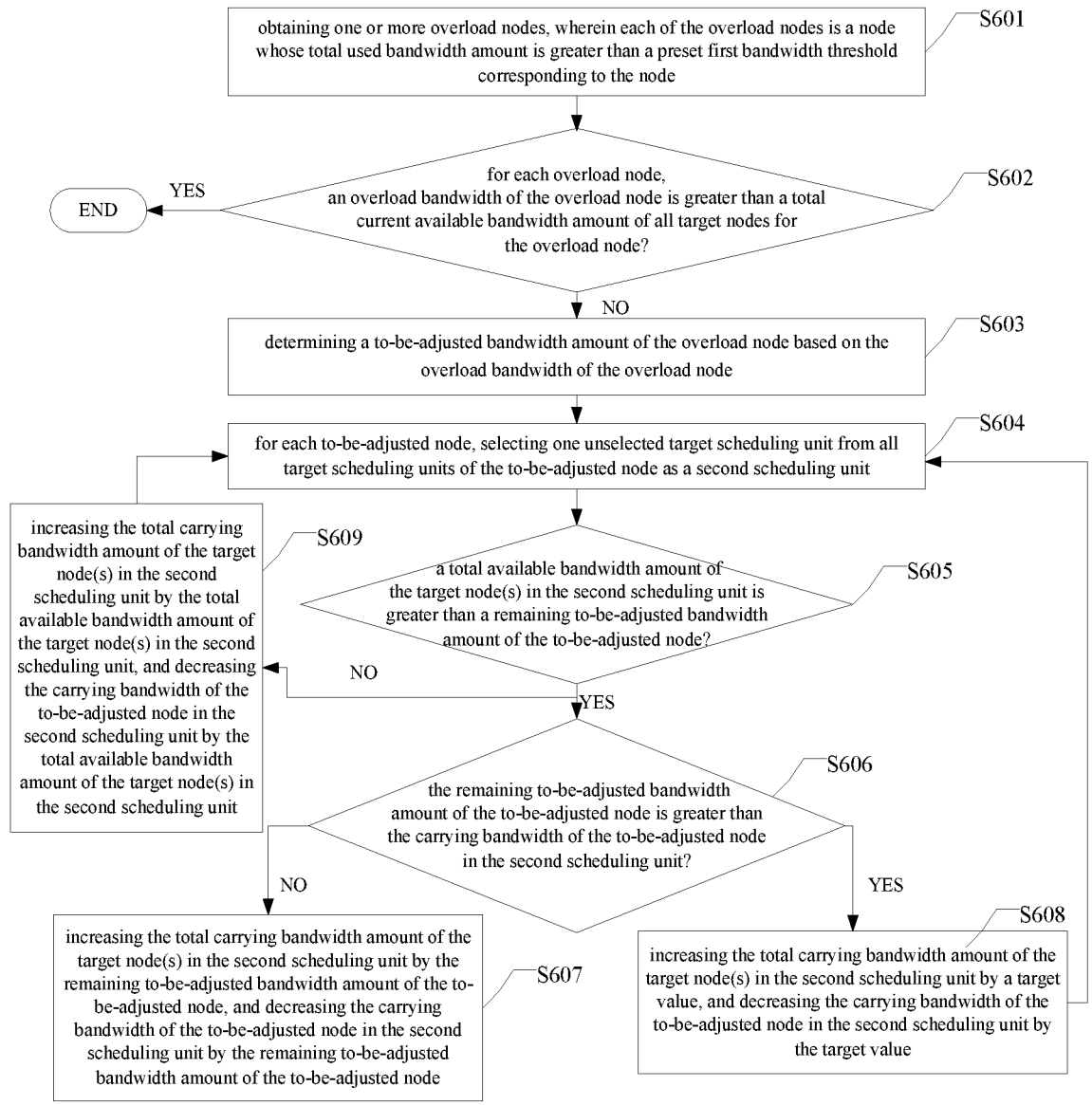
FIG. 6 is a sixth flowchart of a method for bandwidth adjustment according to an embodiment of the present application.

FIG. 6 is a sixth flowchart of a method for bandwidth adjustment according to an embodiment of the present application. The method includes the following steps.

S601: obtaining one or more overload nodes, wherein each of the overload nodes is a node whose total used bandwidth amount is greater than a preset first bandwidth threshold corresponding to the node.

S602: for each of the overload nodes, determining whether an overload bandwidth of the overload node is greater than a total current available bandwidth amount of all target nodes for the overload node, wherein the overload bandwidth of the overload node is a difference between the total used bandwidth amount of the overload node and the preset first bandwidth threshold corresponding to the overload node; the target nodes for the overload node is nodes whose total used bandwidth amount are less than the preset first bandwidth threshold corresponding to the nodes in all scheduling units including the overload node; if the overload bandwidth of the overload node is less than or equal to the total current available bandwidth amount of all target nodes for the overload node, performing step S603; if the overload bandwidth of the overload node is greater than the total current available bandwidth amount of all target nodes for the overload node, ending the process.

S603: determining a to-be-adjusted bandwidth amount of the overload node based on the overload bandwidth of the overload node.

It should be noted that S601-S603 are the same as S101-S103 in the above embodiment, and will not be repeated here.

S604: for each to-be-adjusted node, selecting one unselected target scheduling unit from all target scheduling units of the to-be-adjusted node as a second scheduling unit.

The target scheduling unit for one to-be-adjusted node refers to a scheduling unit including the to-be-adjusted node. One unselected target scheduling unit may be randomly selected from all the target scheduling units of the to-be-adjusted node as the second scheduling unit. Alternatively, one target scheduling unit with the largest total available bandwidth amount may be selected from an unselected target scheduling unit(s) of the to-be-adjusted node as the second scheduling unit. Of course, the second scheduling unit may also be selected in the following manner:

for each to-be-adjusted node, selecting one target scheduling unit that is currently not selected and is at the foremost position in the target scheduling units ordered in a preset manner, as the second scheduling unit, wherein the preset manner may refer to ordering the target scheduling units in a descending order according to the total available bandwidth amounts of the target node(s) and the used bandwidths of the to-be-adjusted node in the target scheduling units.

In the embodiment of the present application, the target scheduling units are ordered in advance. Specifically, all the scheduling units are ordered in a descending order according to the total available bandwidth amounts of the target node(s) in the scheduling units and the used bandwidths of the to-be-adjusted node in the scheduling units. This can comprehensively consider the actual situation of the target node(s) and the to-be-adjusted node, so that the selection of the second scheduling unit is more reasonable, and the adjustment of the bandwidth can be more reasonable.

S605: determining whether a total available bandwidth amount of the target node(s) in the second scheduling unit is greater than a remaining to-be-adjusted bandwidth amount of the to-be-adjusted node; if the total available bandwidth amount of the target node(s) in the second scheduling unit is greater than the remaining to-be-adjusted bandwidth amount of the to-be-adjusted node, performing step S606; if the total available bandwidth amount of the target node(s) in the second scheduling unit is less than or equal to the remaining to-be-adjusted bandwidth amount of the to-be-adjusted node, performing step S609, wherein the remaining to-be-adjusted bandwidth amount of the to-be-adjusted node is a difference between the to-be-adjusted bandwidth amount of the to-be-adjusted node and an adjusted bandwidth amount of the to-be-adjusted node.

The remaining to-be-adjusted bandwidth amount of the to-be-adjusted node is the difference between the to-be-adjusted bandwidth amount of the to-be-adjusted node and the adjusted bandwidth amount. The adjusted bandwidth refers to a total carrying bandwidth amount that has been adjusted by a certain scheduling unit using the method for bandwidth adjustment provided in the embodiment of the present application. For example, the to-be-adjusted node is Node 1, the to-be-adjusted bandwidth amount of Node 1 is 1 G, and the adjusted bandwidth amount of Node 1 is 600M.

This means that the total carrying bandwidth amount of Node 1 is decreased by 600M after the bandwidth adjustment, and the remaining to-be-adjusted bandwidth amount of Node 1 is 400M.

S606: determining whether the remaining to-be-adjusted bandwidth amount of the to-be-adjusted node is greater than the carrying bandwidth of the to-be-adjusted node in the second scheduling unit; if the remaining to-be-adjusted bandwidth amount of the to-be-adjusted node is less than or equal to the carrying bandwidth of the to-be-adjusted node in the second scheduling unit, performing step S607; if the remaining to-be-adjusted bandwidth amount of the to-be-adjusted node is greater than the carrying bandwidth of the to-be-adjusted node in the second scheduling unit, performing step S608.

S607: increasing the total carrying bandwidth amount of the target node(s) in the second scheduling unit by the remaining to-be-adjusted bandwidth amount of the to-be-adjusted node, and decreasing the carrying bandwidth of the to-be-adjusted node in the second scheduling unit by the remaining to-be-adjusted bandwidth amount of the to-be-adjusted node.

For the manner of increasing the total carrying bandwidth amount of the target node(s) in the second scheduling unit by the remaining to-be-adjusted bandwidth amount of the to-be-adjusted node, a reference may be made to the foregoing manner of increasing the total carrying bandwidth amount of the target node(s) in the target scheduling unit by the corresponding increase amount. Alternatively, it is also possible to randomly determine an increase carrying bandwidth amount of the target nodes in the second scheduling unit, and increase the carrying bandwidth of each target node in the second scheduling unit by the increase carrying bandwidth amount corresponding to this target node. Of course, there are other adjustment manners, which will not be listed one by one here.

S608: increasing the total carrying bandwidth amount of the target node(s) in the second scheduling unit by a target value, and decreasing the carrying bandwidth of the to-be-adjusted node in the second scheduling unit by the target value; returning to perform step S604 until the remaining to-be-adjusted bandwidth amount of the to-be-adjusted node is zero, wherein the target value is determined based on the carrying bandwidth of the to-be-adjusted node in the second scheduling unit, and the target value is less than or equal to the carrying bandwidth of the to-be-adjusted node in the second scheduling unit.

In the embodiment of the present application, the target value is greater than zero, which may be the carrying bandwidth of the to-be-adjusted node in the second scheduling unit, and may be less than the carrying bandwidth of the to-be-adjusted node in the second scheduling node. In other words, the target value may be a value selected randomly or by a preset algorithm within a range of zero to the carrying bandwidth of the to-be-adjusted node in the second scheduling unit.

For the manner of increasing the total carrying bandwidth amount of the target node(s) in the second scheduling unit by the target value, a reference may be made to the manner of increasing the total carrying bandwidth amount of the target node(s) in the second scheduling unit by the remaining to-be-adjusted bandwidth amount of the to-be-adjusted node.

S609: increasing the total carrying bandwidth amount of the target node(s) in the second scheduling unit by the total available bandwidth amount of the target node(s) in the second scheduling unit, and decreasing the carrying bandwidth of the to-be-adjusted node in the second scheduling unit by the total available bandwidth amount of the target node(s) in the second scheduling unit; returning to perform step S604 until the remaining to-be-adjusted bandwidth amount of the to-be-adjusted node is zero.

In the embodiment of the present application, in the case where the overload bandwidth of the overload node is less than or equal to the total available bandwidth amount of the target node for the overload node, according to the relationship among the remaining to-be-adjusted bandwidth amount of the to-be-adjusted node, the carrying bandwidth of the to-be-adjusted node in the selected scheduling unit and the total carrying bandwidth amount of the target node(s) in the selected scheduling unit, different increased values of the total carrying bandwidth amount of the target node(s) in the determined scheduling unit can cause the bandwidth to be flexibly adjusted, thereby achieving a finer bandwidth adjustment.

Figure 7:
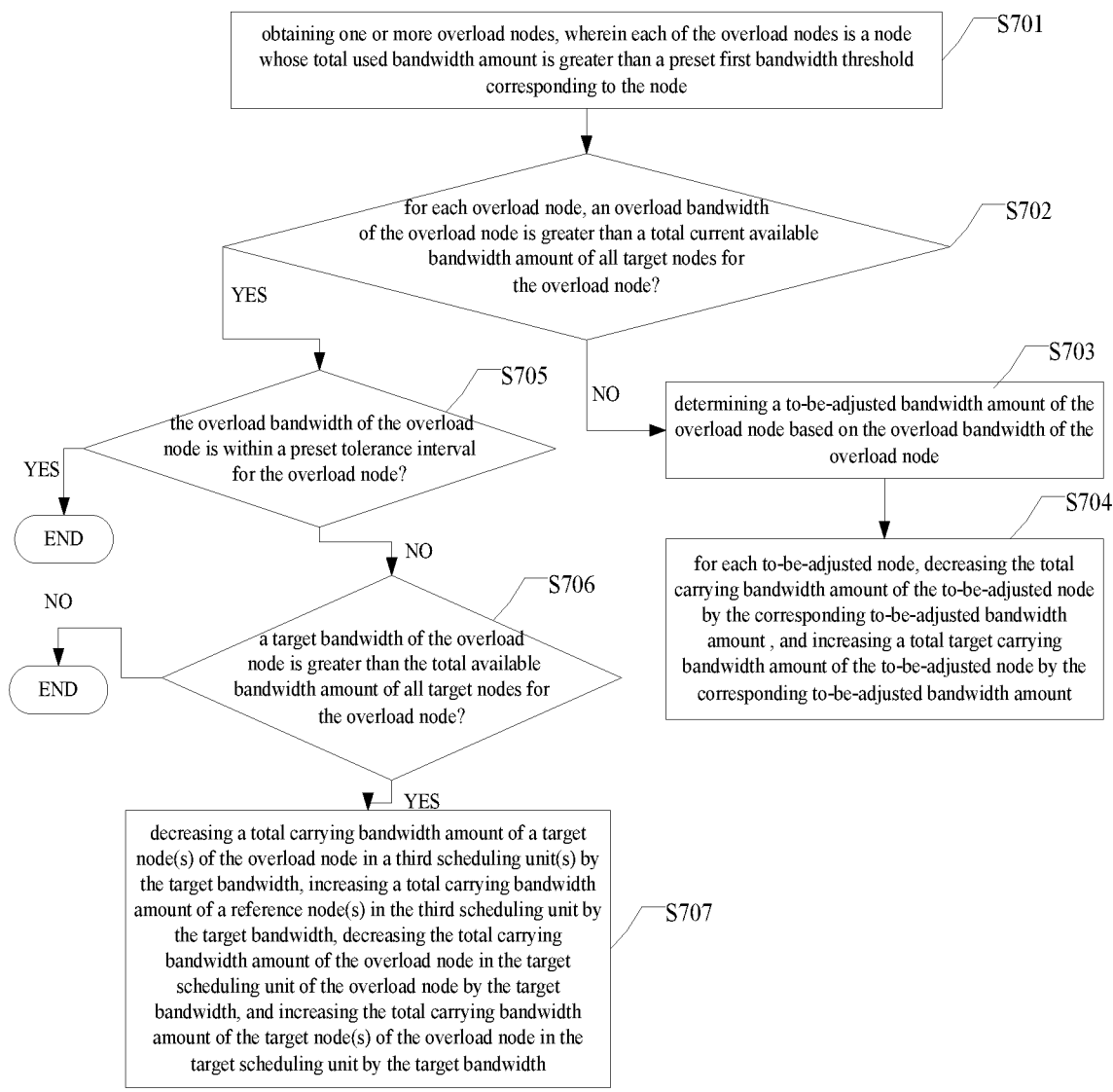
FIG. 7 is a seventh flowchart of a method for bandwidth adjustment according to an embodiment of the present application.

FIG. 7 is a seventh flowchart of a method for bandwidth adjustment according to an embodiment of the present application. The method includes the following steps.

S701: obtaining one or more overload nodes, wherein each of the overload nodes is a node whose total used bandwidth amount is greater than a preset first bandwidth threshold corresponding to the node.

S702: for each of the overload nodes, determining whether an overload bandwidth of the overload node is greater than a total current available bandwidth amount of all target nodes for the overload node, wherein the overload bandwidth of the overload node is a difference between the total used bandwidth amount of the overload node and the preset first bandwidth threshold corresponding to the overload node; the target nodes for the overload node is nodes whose total used bandwidth amount are less than the preset first bandwidth threshold corresponding to the nodes in all scheduling units including the overload node; if the overload bandwidth of the overload node is less than or equal to the total current available bandwidth amount of all target nodes for the overload node, performing step S703; if the overload bandwidth of the overload node is greater than the total current available bandwidth amount of all target nodes for the overload node, performing step S705.

S703: determining a to-be-adjusted bandwidth amount of the overload node based on the overload bandwidth of the overload node.

S704: for each to-be-adjusted node, decreasing the total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node, wherein the to-be-adjusted node is an overload node whose overload bandwidth is less than or equal to a total available bandwidth amount of all target nodes for the to-be-adjusted node; the total target carrying bandwidth amount of the to-be-adjusted node is the sum of current carrying bandwidths of all target nodes for the to-be-adjusted node; an increase carrying bandwidth amount of one target node in one scheduling unit is less than or equal to the available bandwidth of the target node in the scheduling unit, and the increase carrying bandwidth amount of the target node in the scheduling unit is less than or equal to the to-be-adjusted bandwidth amount of the to-be-adjusted node.

S705: determining whether the overload bandwidth of the overload node is within a preset tolerance interval for the overload node; if the overload bandwidth of the overload node is not within the preset tolerance interval for the overload node, performing step S706; if the overload bandwidth of the overload node is within the preset tolerance interval for the overload node, ending the process, wherein the tolerance interval is determined according to a preset second bandwidth threshold corresponding to the overload node and the preset first bandwidth threshold corresponding to the overload node.

In the embodiment of the present application, the tolerance interval may be an interval determined by the difference between the preset second bandwidth threshold corresponding to the overload node and the preset first bandwidth threshold corresponding to the overload node. For example, if the preset first bandwidth threshold corresponding to Node 1 is 10 G and the preset second bandwidth threshold corresponding to Node 1 is 12 G, the tolerance interval is [0, 2 G]. If the overload bandwidth of Node 1 is 1 G, the process ends. This means that the overload bandwidth of Node 1 is currently within the tolerance interval, thus the carrying bandwidth of Node 1 may not be adjusted. If the overload bandwidth of Node 1 is 2.1 G, S706 is performed.

S706: determining whether a target bandwidth of the overload node is greater than the total available bandwidth amount of all target nodes for the overload node; if the target bandwidth of the overload node is greater than the total available bandwidth amount of all target nodes for the overload node, performing step S707; otherwise, ending the process; wherein the target bandwidth of the overload node is a difference between the total used bandwidth amount of the overload node and the preset second bandwidth threshold corresponding to the overload node.

For example, if the total used bandwidth amount of Node 1 is 14 G and the preset second bandwidth threshold corresponding to Node 1 is 12 G, the target bandwidth of Node 1 is 2 G. If the total available bandwidth amount of all target nodes for Node 1 is 1 G, then step S707 is performed.

S707: decreasing a total carrying bandwidth amount of a target node(s) for the overload node in a third scheduling unit(s) by the target bandwidth, increasing a total carrying bandwidth amount of a reference node(s) in the third scheduling unit by the target bandwidth, decreasing the total carrying bandwidth amount of the overload node in the target scheduling unit for the overload node by the target bandwidth, and increasing the total carrying bandwidth amount of the target node(s) for the overload node in the target scheduling unit by the target bandwidth, wherein the third scheduling unit(s) is a scheduling unit(s) that includes the target node(s) for the overload node and does not include the overload node; the reference node(s) is a node(s) other than the target node(s) for the overload node and the overload node in the third scheduling unit.

The third scheduling unit(s) is a scheduling unit(s) including the target node(s) for the overload node, except for the target scheduling unit(s) including the overload node. For example, the overload node is Node A. The target nodes for Node A are B, C. Scheduling Unit 1 includes Nodes A, B, and C. Scheduling Unit 2 includes Nodes B, C, and D. Scheduling Unit 3 includes Nodes C, E and H. Thus, the third scheduling units are Scheduling Unit 2 and Scheduling Unit 3, and the reference nodes are Nodes D, E, and H.

For the manner of increasing the total carrying bandwidth amount of the reference node(s) in the third scheduling unit(s) by the target bandwidth, a reference may be made to the manner of increasing the total carrying bandwidth amount of the target node(s) in the first scheduling unit by the corresponding to-be-adjusted bandwidth amount, or to the manner of increasing the total carrying bandwidth amount of the target node(s) in the target scheduling unit by the corresponding increase amount.

Continuing the example in S706, the target bandwidth is 1 G, and Scheduling Unit 1 is the target scheduling unit. During specific adjustment, the total carrying bandwidth amount of Nodes D, E, and H in Scheduling Unit 2 and Scheduling Unit 3 is increased by 1 G, and then the total carrying bandwidth amount of Nodes B and C in Scheduling Unit 2 and Scheduling Unit 3 is decreased by 1 G; the carrying bandwidth of Node A in Scheduling Unit 1 is decreased by 1 G, and the total carrying bandwidth amount of Nodes B and C in Scheduling Unit 1 is increased by 1 G.

In the embodiment of the present application, when the overload bandwidth of the overload node is less than or equal to the total available bandwidth amount of the target node(s) for the overload node, the bandwidth is adjusted jointly by decreasing the total carrying bandwidth amount of the target node(s) in the third scheduling unit(s), increasing the total carrying bandwidth amount of the reference node(s) in the third scheduling unit(s), increasing the total carrying bandwidth amount of the target node(s) in the target scheduling unit and decreasing the total carrying bandwidth amount of the overload node in the target scheduling unit, thereby achieving distributed bandwidth balance, balancing the traffic of related nodes in real time, and obtaining more flexible adjustment method and more accurate bandwidth adjustment.

In a second aspect, an embodiment of the present application provides an apparatus for bandwidth adjustment. The apparatus comprises:

an obtaining module, configured for obtaining an overload node, wherein the overload node is a node whose total used bandwidth amount is greater than a preset first bandwidth threshold corresponding to the overload node;

a first judging module, configured for determining whether an overload bandwidth of the overload node is greater than a total current available bandwidth amount of a target node(s) for the overload node, wherein the overload bandwidth of the overload node is a difference between the total used bandwidth amount of the overload node and the preset first bandwidth threshold corresponding to the overload node; the target node(s) for the overload node is a node(s) whose total used bandwidth amount is less than the preset first bandwidth threshold corresponding to the overload node in all scheduling units including the overload node;

a determining module, configured for when the overload bandwidth of the overload node is less than or equal to the total current available bandwidth amount of the target node(s) for the overload node, determining the overload node as a to-be-adjusted node and determining a to-be-adjusted bandwidth amount of the to-be-adjusted node;

a first adjusting module, configured for decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node, wherein the total target carrying bandwidth amount of the to-be-adjusted node is a sum of current carrying bandwidth(s) of the target node(s) for the to-be-adjusted node; an increase carrying bandwidth amount of the target node(s) in a scheduling unit is less than or equal to an available bandwidth of the target node(s) in the scheduling unit, and the increase carrying bandwidth amount of the target node(s) in the scheduling unit is less than or equal to the to-be-adjusted bandwidth amount of the to-be-adjusted node.

In an implementation, the first adjusting module comprises:

a first judging sub-module, configured for determining whether the to-be-adjusted node meets a target condition, wherein the target condition is that the overload bandwidth of the to-be-adjusted node is less than a first preset threshold corresponding to the to-be-adjusted node, and the total available bandwidth amount of the target node(s) for the to-be-adjusted node is greater than a second preset threshold corresponding to the to-be-adjusted node, wherein the second preset threshold is greater than the first preset threshold;

a first selecting sub-module, configured for when the to-be-adjusted node meets the target condition, selecting one target scheduling unit whose total available bandwidth amount is greater than the to-be-adjusted bandwidth amount of the to-be-adjusted node from all target scheduling units as a first scheduling unit, wherein the target scheduling units are scheduling units including the to-be-adjusted node;

a first adjusting sub-module, configured for decreasing a carrying bandwidth of the to-be-adjusted node in the first scheduling unit by the to-be-adjusted bandwidth amount corresponding to the to-be-adjusted node; and a second adjusting sub-module, configured for increasing a total carrying bandwidth amount of the target node(s) in the first scheduling unit by the to-be-adjusted bandwidth amount corresponding to the to-be-adjusted node.

In an implementation, the first adjusting module further comprises:

a second judging sub-module, configured for, when the to-be-adjusted node does not meet the target condition, determining whether there is only one target scheduling unit for the to-be-adjusted node;

a third adjusting sub-module, configured for when there is only one target scheduling unit for the to-be-adjusted node, decreasing the total carrying bandwidth amount of the to-be-adjusted node by the to-be-adjusted bandwidth amount corresponding to the to-be-adjusted node, and increasing the carrying bandwidth of the target node(s) in the target scheduling unit by the to-be-adjusted bandwidth corresponding to the to-be-adjusted node;

a first calculating sub-module, configured for when there are two or more target scheduling units of the to-be-adjusted node, calculating a first ratio of total available bandwidth amounts of all target scheduling units;

a second calculating sub-module, configured for calculating an increase amount for each of the target scheduling units based on the calculated first ratio and the to-be-adjusted bandwidth amount of the to-be-adjusted node; and a fourth adjusting sub-module, configured for increasing a total carrying bandwidth amount of a target node(s) in each of the target scheduling units by an increase amount corresponding to this target scheduling unit, and decreasing a carrying bandwidth of the to-be-adjusted node in the target scheduling unit by the increase amount corresponding to this target scheduling unit.

In an implementation, the fourth adjusting sub-module comprises:

a first judging unit, configured for determining whether only one target node is included in the target scheduling unit;

a first adjusting unit, configured for increasing the total carrying bandwidth amount of the target node in the target scheduling unit by the increase amount corresponding to this target scheduling unit and decreasing the carrying bandwidth of the to-be-adjusted node in the target scheduling unit by the increase amount corresponding to this target scheduling unit;

a first calculating unit, configured for when two or more target nodes are included in the target scheduling unit, calculating a second ratio of the available bandwidths of the target nodes in the target scheduling unit;

a second calculating unit, configured for calculating an adjustment value for each target node in the target scheduling unit based on the calculated second ratio and the calculated increase amount for the target scheduling unit; and a second adjusting unit, configured for increasing the carrying bandwidth of each target node in the target scheduling unit by a to-be-adjusted bandwidth amount corresponding to this target node and decreasing the carrying bandwidth of the to-be-adjusted node in the target scheduling unit by the increase amount corresponding to the target scheduling unit.

In an implementation, the first adjusting module is configured for selecting a reference scheduling unit for the to-be-adjusted node from the scheduling units including the to-be-adjusted node by a greedy algorithm, decreasing the total carrying bandwidth amount of the to-be-adjusted node by the to-be-adjusted bandwidth amount corresponding to the to-be-adjusted node and increasing a total carrying bandwidth amount of the reference scheduling unit for the to-be-adjusted node by the to-be-adjusted bandwidth amount corresponding to the to-be-adjusted node.

In an implementation, the first adjusting module comprises:

a second selecting sub-module, configured for selecting one unselected target scheduling unit from all target scheduling units of the to-be-adjusted node as a second scheduling unit;

a third judging sub-module, configured for determining whether a total available bandwidth amount of a target node(s) in the second scheduling unit is greater than a remaining to-be-adjusted bandwidth amount of the to-be-adjusted node, wherein the remaining to-be-adjusted bandwidth amount of the to-be-adjusted node is a difference between the to-be-adjusted bandwidth amount of the to-be-adjusted node and an adjusted bandwidth amount of the to-be-adjusted node;

a fourth judging sub-module, configured for when the total available bandwidth amount of the target node(s) in the second scheduling unit is greater than the remaining to-be-adjusted bandwidth amount of the to-be-adjusted node, determining whether the remaining to-be-adjusted bandwidth amount of the to-be-adjusted node is greater than a carrying bandwidth of the to-be-adjusted node in the second scheduling unit;

a fifth adjusting sub-module, configured for when the remaining to-be-adjusted bandwidth amount of the to-be-adjusted node is less than or equal to the carrying bandwidth of the to-be-adjusted node in the second scheduling unit, increasing the total carrying bandwidth amount of the target node(s) in the second scheduling unit by the remaining to-be-adjusted bandwidth amount of the to-be-adjusted node and decreasing the carrying bandwidth of the to-be-adjusted node in the second scheduling unit by the remaining to-be-adjusted bandwidth amount of the to-be-adjusted node;

a sixth adjusting sub-module, configured for when the remaining to-be-adjusted bandwidth amount of the to-be-adjusted node is greater than the carrying bandwidth of the to-be-adjusted node in the second scheduling unit, increasing the total carrying bandwidth amount of the target node(s)

in the second scheduling unit by a target value and decreasing the carrying bandwidth of the to-be-adjusted node in the second scheduling unit by the target value; and returning to perform the second selecting sub-module, until the remaining to-be-adjusted bandwidth amount of the to-be-adjusted node is zero, wherein the target value is determined based on the carrying bandwidth of the to-be-adjusted node in the second scheduling unit, and is less than or equal to the carrying bandwidth of the to-be-adjusted node in the second scheduling unit; and a seventh adjusting sub-module, configured for when the total available bandwidth amount of the target node(s) in the second scheduling unit is less than or equal to the remaining to-be-adjusted bandwidth amount of the to-be-adjusted node, increasing the total carrying bandwidth amount of the target node(s) in the second scheduling unit by the total available bandwidth amount of the target node(s) in the second scheduling unit and decreasing the carrying bandwidth of the to-be-adjusted node in the second scheduling unit by the total available bandwidth amount of the target node(s) in the second scheduling unit; and returning to perform the second selecting sub-module, until the remaining to-be-adjusted bandwidth amount of the to-be-adjusted node is zero.

In an implementation, the second selecting sub-module is configured for selecting one target scheduling unit that is not currently selected and is at a foremost position in the target scheduling units ordered in a preset manner, as the second scheduling unit, wherein the preset manner indicates ordering the scheduling units in a descending order based on total available bandwidth amounts of the target node(s) and used bandwidths of the to-be-adjusted node in the target scheduling units.

In an implementation, the apparatus further comprises:

a second judging module, configured for, when the overload bandwidth of the overload node is greater than the total current available bandwidth amount of the target node(s) for the overload node and when the overload bandwidth of the overload node is greater than a total reference available bandwidth amount of the overload node, determining whether the overload bandwidth of the overload node is within a preset tolerance interval for the overload node, wherein the tolerance interval is determined by a preset second bandwidth threshold corresponding to the overload node and the preset first bandwidth threshold corresponding to the overload node;

a third judging module, configured for when the overload bandwidth of the overload node is not within the preset tolerance interval for the overload node, determining whether a target bandwidth of the overload node is greater than the total available bandwidth amount of the target node(s) for the overload node, wherein the target bandwidth of the overload node is a difference between the total used bandwidth amount of the overload node and the preset second bandwidth threshold corresponding to the overload node; and a second adjusting module, configured for when the target bandwidth of the overload node is greater than the total available bandwidth amount of the target node(s) for the overload node, decreasing a total carrying bandwidth amount of the target node(s) for the overload node in a third scheduling unit(s) by the target bandwidth, increasing a total carrying bandwidth amount of a reference node(s) in the third scheduling unit(s) by the target bandwidth, decreasing the total carrying bandwidth amount of the overload node in the target scheduling unit for the overload node by the target bandwidth, and increasing the total carrying bandwidth amount of the target node(s) for the overload node in the target scheduling unit by the target bandwidth, wherein the third scheduling unit(s) is a scheduling unit(s) that includes the target node(s) for the overload node, except for the target scheduling units including the overload node; the reference node(s) is a node(s) other than the target node(s) for the overload node and the overload node in the third scheduling unit(s).

For clarity of the solution, an apparatus for bandwidth adjustment provided by an embodiment of the present application is described below with reference to FIG. 8.

Figure 8:
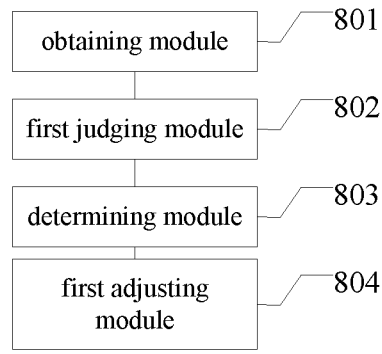
FIG. 8 is a structural diagram of an apparatus for bandwidth adjustment according to an embodiment of the present application.

FIG. 8 is a structural diagram of an apparatus for bandwidth adjustment according to an embodiment of the present application. The apparatus comprises:

an obtaining module 801, configured for obtaining one or more overload nodes, wherein each of the overload nodes is a node whose total used bandwidth amount is greater than a preset first bandwidth threshold corresponding to the node.

a first judging module 802, configured for determining, for each overload node, whether an overload bandwidth of the overload node is greater than a total current available bandwidth amount of all target nodes for the overload node, wherein the overload bandwidth of the overload node is a difference between the total used bandwidth amount of the overload node and the preset first bandwidth threshold corresponding to the overload node; the target nodes for the overload node are nodes whose total used bandwidth amount are less than the preset first bandwidth threshold corresponding to the nodes in all scheduling units including the overload node;

a determining module 803, configured for determining a to-be-adjusted bandwidth amount of the overload node based on the overload bandwidth of the overload node when the first judging module 802 determines that the overload bandwidth of the overload node is less than or equal to the total current available bandwidth amount of all target nodes for the overload node;

a first adjusting module 804, configured for, for each to-be-adjusted node, decreasing a total carrying bandwidth amount of the to-be-adjusted node by a to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node, wherein the to-be-adjusted node is an overload node whose overload bandwidth is less than or equal to the total available bandwidth amount of all target nodes for the overload node; the total target carrying bandwidth amount of the to-be-adjusted node is a sum of current carrying bandwidths of all target nodes for the to-be-adjusted node; an increase carrying bandwidth amount of one target node in one scheduling unit is less than or equal to an available bandwidth of the target node in the scheduling unit, and the increase carrying bandwidth amount of one target node in one scheduling unit is less than or equal to the to-be-adjusted bandwidth amount of the to-be-adjusted node.

The to-be-adjusted bandwidth amount of the overload node may be determined according to the overload bandwidth amount of the overload node. In the case where the overload bandwidth of the overload node is less than or equal to the total available bandwidth amount of the target node(s) for the overload node, the total carrying bandwidth amount of the overload node is decreased, and the sum of the carrying bandwidths of all target nodes is increased. Compared with the case where the carrying bandwidths of the overload node and the target nodes need to be adjusted proportionally in the existing technologies, in the embodiments of the present application, the carrying bandwidths of the overload node and the target nodes may not be adjusted proportionally. Instead, the total carrying bandwidth amount of the overload node is decreased by the corresponding to-be-adjusted bandwidth amount, and the total carrying bandwidth amount of the target nodes is increased by the corresponding to-be-adjusted bandwidth amount. Therefore, bandwidth adjustment of the present application is more accurate compared with the existing technologies.

In an implementation of the present application, the first adjusting module 804 may comprise:

a first judging sub-module, configured for determining, each to-be-adjusted node, whether the to-be-adjusted node meets a target condition, wherein the target condition is that the overload bandwidth of the to-be-adjusted node is less than a first preset threshold corresponding to the to-be-adjusted node, and the total available bandwidth amount of all target nodes for the to-be-adjusted node is greater than a second preset threshold corresponding to the to-be-adjusted node, wherein the second preset threshold is greater than the first preset threshold;

a first selecting sub-module, configured for, when the to-be-adjusted node meets the target condition, selecting, from all target scheduling units, one target scheduling unit whose total available bandwidth amount is greater than the to-be-adjusted bandwidth amount of the to-be-adjusted node as a first scheduling unit, wherein the target scheduling units are scheduling units including the to-be-adjusted node and other nodes than the to-be-adjusted node;

a first adjusting sub-module, configured for decreasing a carrying bandwidth of the to-be-adjusted node in the first scheduling unit by the to-be-adjusted bandwidth amount corresponding to the to-be-adjusted node;

a second adjusting sub-module, configured for increasing the total carrying bandwidth amount of the target node(s) in the first scheduling unit by the to-be-adjusted bandwidth amount corresponding to the to-be-adjusted node.

In an implementation of the present application, the first adjusting module 804 may further comprise:

a second judging sub-module, configured for when the to-be-adjusted node does not meet the target condition, determining whether there is only one target scheduling unit for the to-be-adjusted node;

a third adjusting sub-module, configured for when there is only one target scheduling unit for the to-be-adjusted node, decreasing the total carrying bandwidth amount of the to-be-adjusted node by the to-be-adjusted bandwidth amount corresponding to the to-be-adjusted node, and increasing the carrying bandwidth of the target node(s) in the target scheduling unit by the to-be-adjusted bandwidth corresponding to the to-be-adjusted node;

a first calculating sub-module, configured for when there are two or more target scheduling units of the to-be-adjusted node, calculating a first ratio of total available bandwidth amounts of all target scheduling units;

a second calculating sub-module, configured for calculating an increase amount of each target scheduling unit based on the calculated first ratio and the to-be-adjusted bandwidth amount of the to-be-adjusted node; and a fourth adjusting sub-module, configured for, for each target scheduling unit, increasing the total carrying bandwidth amount of the target node(s) in the target scheduling unit by the increase amount corresponding to the target scheduling unit, and decreasing the carrying bandwidth of the to-be-adjusted node in the target scheduling unit by the increase amount corresponding to the target scheduling unit.

In an implementation of the present application, the fourth adjusting sub-module may comprise:

a first judging unit, configured for, for each target scheduling unit, determining whether only one target node is included in the target scheduling unit;

a first adjusting unit, configured for when only one target node is included in the target scheduling unit, increasing the total carrying bandwidth amount of the target node in the target scheduling unit by the increase amount corresponding to the target scheduling unit, and decreasing the carrying bandwidth of the to-be-adjusted node in the target scheduling unit by the increase amount corresponding to the target scheduling unit;

a first calculating unit, configured for when two or more target nodes are included in the target scheduling unit, calculating a second ratio of the available bandwidths of the target nodes in the target scheduling unit;

a second calculating unit, configured for calculating an adjustment value for each target node in the target scheduling unit based on the calculated second ratio and the calculated increase amount for the target scheduling unit;

a second adjusting unit, configured for increasing the carrying bandwidth of each target node in the target scheduling unit by a to-be-adjusted bandwidth amount corresponding to the target node, and decreasing the carrying bandwidth of the to-be-adjusted node in the target scheduling unit by the increase amount corresponding to the target scheduling unit.

In an implementation of the present application, the first adjusting module 804 is specifically configured for selecting, for each to-be-adjusted node, a reference scheduling unit for the to-be-adjusted node from the scheduling units including the to-be-adjusted node by a greedy algorithm, decreasing the total carrying bandwidth amount of the to-be-adjusted node by the to-be-adjusted bandwidth amount corresponding to the to-be-adjusted node and increasing a total carrying bandwidth amount of the reference scheduling unit for the to-be-adjusted node by the to-be-adjusted bandwidth amount corresponding to the to-be-adjusted node.

In an implementation, the first adjusting module 804 may comprise:

a second selecting sub-module, configured for selecting, for each to-be-adjusted node, selecting one unselected target scheduling unit from all target scheduling units of the to-be-adjusted node as a second scheduling unit;

a third judging sub-module, configured for determining whether a total available bandwidth amount of a target node(s) in the second scheduling unit is greater than a remaining to-be-adjusted bandwidth amount of the to-be-adjusted node, wherein the remaining to-be-adjusted bandwidth amount of the to-be-adjusted node is a difference between the to-be-adjusted bandwidth amount of the to-be-adjusted node and an adjusted bandwidth amount of the to-be-adjusted node;

a fourth judging sub-module, configured for when the total available bandwidth amount of the target node(s) in the second scheduling unit is greater than the remaining to-be-adjusted bandwidth amount of the to-be-adjusted node, determining whether the remaining to-be-adjusted bandwidth amount of the to-be-adjusted node is greater than a carrying bandwidth of the to-be-adjusted node in the second scheduling unit;

a fifth adjusting sub-module, configured for when the remaining to-be-adjusted bandwidth amount of the to-be-adjusted node is less than or equal to the carrying bandwidth of the to-be-adjusted node in the second scheduling unit, increasing the total carrying bandwidth amount of the target node(s) in the second scheduling unit by the remaining to-be-adjusted bandwidth amount of the to-be-adjusted node and decreasing the carrying bandwidth of the to-be-adjusted node in the second scheduling unit by the remaining to-be-adjusted bandwidth amount of the to-be-adjusted node;

a sixth adjusting sub-module, configured for, when the remaining to-be-adjusted bandwidth amount of the to-be-adjusted node is greater than the carrying bandwidth of the to-be-adjusted node in the second scheduling unit, increasing the total carrying bandwidth amount of the target node(s) in the second scheduling unit by a target value and decreasing the carrying bandwidth of the to-be-adjusted node in the second scheduling unit by the target value; and returning to perform the second selecting sub-module, until the remaining to-be-adjusted bandwidth amount of the to-be-adjusted node is zero, wherein the target value is determined based on the carrying bandwidth of the to-be-adjusted node in the second scheduling unit, and is less than or equal to the carrying bandwidth of the to-be-adjusted node in the second scheduling unit;

a seventh adjusting sub-module, configured for when the total available bandwidth amount of the target node(s) in the second scheduling unit is less than or equal to the remaining to-be-adjusted bandwidth amount of the to-be-adjusted node, increasing the total carrying bandwidth amount of the target node(s) in the second scheduling unit by the total available bandwidth amount of the target node(s) in the second scheduling unit and decreasing the carrying bandwidth of the to-be-adjusted node in the second scheduling unit by the total available bandwidth amount of the target node(s) in the second scheduling unit; and returning to perform the second selecting sub-module, until the remaining to-be-adjusted bandwidth amount of the to-be-adjusted node is zero.

In an implementation, the second selecting sub-module is configured for selecting, for each to-be-adjusted node, one target scheduling unit that is not currently selected and is at a foremost position in the target scheduling units ordered in a preset manner, as the second scheduling unit, wherein the preset manner indicates ordering the scheduling units in a descending order based on total available bandwidth amounts of the target node(s) and used bandwidths of the to-be-adjusted node in the target scheduling units.

In an implementation, the apparatus may further comprise:

a second judging module, configured for, when the overload bandwidth of the overload node is greater than the total current available bandwidth amount of all target nodes for the overload node and when the overload bandwidth of the overload node is greater than a total reference available bandwidth amount of the overload node, determining whether the overload bandwidth of the overload node is within a preset tolerance interval for the overload node, wherein the tolerance interval is determined by a preset second bandwidth threshold corresponding to the overload node and the preset first bandwidth threshold corresponding to the overload node;

a third judging module, configured for when the overload bandwidth of the overload node is not within the preset tolerance interval for the overload node, determining whether a target bandwidth of the overload node is greater than the total available bandwidth amount of all target nodes for the overload node, wherein the target bandwidth of the overload node is a difference between the total used bandwidth amount of the overload node and the preset second bandwidth threshold corresponding to the overload node;

a second adjusting module, configured for when the target bandwidth of the overload node is greater than the total available bandwidth amount of all target nodes for the overload node, decreasing a total carrying bandwidth amount of the target node(s) for the overload node in a third scheduling unit(s) by the target bandwidth, increasing a total carrying bandwidth amount of a reference node(s) in the third scheduling unit(s) by the target bandwidth, decreasing the total carrying bandwidth amount of the overload node in the target scheduling unit for the overload node by the target bandwidth, and increasing the total carrying bandwidth amount of the target node(s) for the overload node in the target scheduling unit by the target bandwidth, wherein the third scheduling unit(s) is a scheduling unit(s) that includes the target node(s) for the overload node, except for the target scheduling units including the overload node; the reference node(s) is a node(s) other than the target node(s) for the overload node and the overload node in the third scheduling unit(s).

Figure 9:
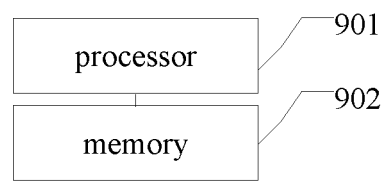
FIG. 9 is a structural diagram of an electronic device according to an embodiment of the present application.

An embodiment of the present application further provides an electronic device. As shown in FIG. 9, the electronic device comprises a processor 901 and a memory 902.

The memory 902 is configured to store a computer program.

The processor 901 is configured to execute the program stored in the memory 902 to implement the following steps:

obtaining one or more overload nodes, wherein each of the overload nodes is a node whose total used bandwidth amount is greater than a preset first bandwidth threshold corresponding to the node;

for each of the overload nodes, determining whether an overload bandwidth of the overload node is greater than a total current available bandwidth amount of all target nodes for the overload node, wherein the overload bandwidth of the overload node is a difference between the total used bandwidth amount of the overload node and the preset first bandwidth threshold corresponding to the overload node; the target nodes for the overload node are nodes whose total used bandwidth amount are less than the preset first bandwidth threshold corresponding to the nodes in all scheduling units including the overload node;

when the overload bandwidth of the overload node is less than or equal to the total current available bandwidth amount of all the target nodes for the overload node, determining a to-be-adjusted bandwidth amount of the overload node based on the overload bandwidth of the overload node; and for each to-be-adjusted node, decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node, wherein the to-be-adjusted node is an overload node whose overload bandwidth is less than or equal to the total available bandwidth amount of all target nodes for the overload node; the total target carrying bandwidth amount of the to-be-adjusted node is a sum of current carrying bandwidth(s) of all target nodes for the to-be-adjusted node; an increase carrying bandwidth amount of one target node in one scheduling unit is less than or equal to an available bandwidth of the target node in the scheduling unit, and the increase carrying bandwidth amount of the target node in the scheduling unit is less than or equal to the to-be-adjusted bandwidth amount of the to-be-adjusted node.

The memory may include Random Access Memory (RAM), and may also include Non-Volatile Memory (NVM), such as at least one disk memory. Optionally, the memory may also be at least one storage device located away from the foregoing processor.

The above processor may be a general-purpose processor, including a Central Processing Unit (CPU), a Network Processor (NP), or the like; it may also be a Digital Signal Processor (DSP), an Application Specific Integrated Circuit (ASIC), a Field-Programmable Gate Array (FPGA) or other programmable logic devices, discrete gate or transistor logic devices, discrete hardware components.

In the embodiment of the present application, the to-be-adjusted bandwidth amount of the overload node may be determined according to the overload bandwidth amount of the overload node. In the case where the overload bandwidth of the overload node is less than or equal to the total available bandwidth amount of the target node(s) for the overload node, the total carrying bandwidth amount of the overload node is decreased, and the sum of the carrying bandwidths of all target nodes is increased. Compared with the case where the carrying bandwidths of the overload node and the target nodes need to be adjusted proportionally in the existing technologies, in the embodiments of the present application, the carrying bandwidths of the overload node and the target nodes may not be adjusted proportionally. Instead, the total carrying bandwidth amount of the overload node is decreased by the corresponding to-be-adjusted bandwidth amount, and the total carrying bandwidth amount of the target nodes is increased by the corresponding to-be-adjusted bandwidth amount. Therefore, bandwidth adjustment of the present application is more accurate compared with the existing technologies.

In still another implementation of the present application, a computer-readable storage medium is provided. The computer-readable storage medium stores a computer program, which is executed by a processor, so as to cause the processor to perform the method for bandwidth adjustment according to any of the above embodiments.

In the embodiment of the present application, the to-be-adjusted bandwidth amount of the overload node may be determined according to the overload bandwidth amount of the overload node. In the case where the overload bandwidth of the overload node is less than or equal to the total available bandwidth amount of the target node(s) for the overload node, the total carrying bandwidth amount of the overload node is decreased, and the sum of the carrying bandwidths of all target nodes is increased. Compared with the case where the carrying bandwidths of the overload node and the target nodes need to be adjusted proportionally in the existing technologies, in the embodiments of the present application, the carrying bandwidths of the overload node and the target nodes may not be adjusted proportionally. Instead, the total carrying bandwidth amount of the overload node is decreased by the corresponding to-be-adjusted bandwidth amount, and the total carrying bandwidth amount of the target nodes is increased by the corresponding to-be-adjusted bandwidth amount. Therefore, bandwidth adjustment of the present application is more accurate compared with the existing technologies.

In yet still another implementation of the present application, a computer program product is provided. The computer program product is executed by a computer, so as to cause the computer to perform the method for bandwidth adjustment according to any of the above embodiments.

In the embodiment of the present application, the to-be-adjusted bandwidth amount of the overload node may be determined according to the overload bandwidth amount of the overload node. In the case where the overload bandwidth of the overload node is less than or equal to the total available bandwidth amount of the target node(s) for the overload node, the total carrying bandwidth amount of the overload node is decreased, and the sum of the carrying bandwidths of all target nodes is increased. Compared with the case where the carrying bandwidths of the overload node and the target nodes need to be adjusted proportionally in the existing technologies, in the embodiments of the present application, the carrying bandwidths of the overload node and the target nodes may not be adjusted proportionally. Instead, the total carrying bandwidth amount of the overload node is decreased by the corresponding to-be-adjusted bandwidth amount, and the total carrying bandwidth amount of the target nodes is increased by the corresponding to-be-adjusted bandwidth amount. Therefore, bandwidth adjustment of the present application is more accurate compared with the existing technologies.

In yet still another implementation of the present application, a computer program is provided. The computer program is executed by a computer, so as to cause the computer to perform the method for bandwidth adjustment according to any of the above embodiments.

In the embodiment of the present application, the to-be-adjusted bandwidth amount of the overload node may be determined according to the overload bandwidth amount of the overload node. In the case where the overload bandwidth of the overload node is less than or equal to the total available bandwidth amount of the target node(s) for the overload node, the total carrying bandwidth amount of the overload node is decreased, and the sum of the carrying bandwidths of all target nodes is increased. Compared with the case where the carrying bandwidths of the overload node and the target nodes need to be adjusted proportionally in the existing technologies, in the embodiments of the present application, the carrying bandwidths of the overload node and the target nodes may not be adjusted proportionally. Instead, the total carrying bandwidth amount of the overload node is decreased by the corresponding to-be-adjusted bandwidth amount, and the total carrying bandwidth amount of the target nodes is increased by the corresponding to-be-adjusted bandwidth amount. Therefore, bandwidth adjustment of the present application is more accurate compared with the existing technologies.

INDUSTRIAL APPLICABILITY

A method and apparatus for bandwidth adjustment, an electronic device and a computer-readable storage medium provided in the embodiments of the present application can determine a to-be-adjusted bandwidth amount of an overload node according to an overload bandwidth amount of the overload node; and when the overload bandwidth of the overload node is less than or equal to the total available bandwidth amount of the target node for the overload node, decrease the total carrying bandwidth amount of the overload node, and increase the sum of the carrying bandwidths of all target nodes. Compared with the case where the carrying bandwidths of the overload node and the target nodes need to be adjusted proportionally in the existing technologies, in the embodiments of the present application, the carrying bandwidths of the overload node and the target nodes may not be adjusted proportionally. Instead, the total carrying bandwidth amount of the overload node is decreased by the corresponding to-be-adjusted bandwidth amount, and the total carrying bandwidth amount of the target nodes is increased by the corresponding to-be-ad-

The invention claimed is:

1. A method for bandwidth adjustment, comprising:
   obtaining an overload node(s), wherein each of the overload node(s) is a node whose total used bandwidth amount is greater than a preset first bandwidth threshold corresponding to the overload node;
   for each of the overload node(s), determining whether an overload bandwidth of the overload node is greater than a total current available bandwidth amount of all of target nodes for the overload node, wherein the overload bandwidth of the overload node is a difference between the total used bandwidth amount of the overload node and the preset first bandwidth threshold corresponding to the overload node; the target nodes for the overload node are nodes whose total used bandwidth amount is less than the preset first bandwidth threshold corresponding to the overload node in all scheduling units including the overload node;
   when the overload bandwidth of the overload node is less than or equal to the total current available bandwidth amount of all of the target nodes for the overload node, determining a to-be-adjusted bandwidth amount of the overload node based on the overload bandwidth of the overload node;
   for each to-be-adjusted node, decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node, wherein the to-be-adjusted node is an overload node whose overload bandwidth is less than or equal to the total available bandwidth amount of all of target nodes for the to-be-adjusted node; the total target carrying bandwidth amount of the to-be-adjusted node is a sum of current carrying bandwidth(s) of all of the target nodes for the to-be-adjusted node; an increase carrying bandwidth amount of one target node in one scheduling unit is less than or equal to an available bandwidth of the target node in the scheduling unit, and is less than or equal to the to-be-adjusted bandwidth amount of the to-be-adjusted node.

2. The method according to claim 1, wherein the step of, for each to-be-adjusted node, decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node comprises:
   for each to-be-adjusted node, determining whether the to-be-adjusted node meets a target condition, wherein the target condition is that the overload bandwidth of the to-be-adjusted node is less than a first preset threshold corresponding to the to-be-adjusted node, and the total available bandwidth amount of all of the target nodes for the to-be-adjusted node is greater than a second preset threshold corresponding to the to-be-adjusted node, wherein the second preset threshold is greater than the first preset threshold;
   when the to-be-adjusted node meets the target condition, selecting one target scheduling unit whose total available bandwidth amount is greater than the to-be-adjusted bandwidth amount of the to-be-adjusted node from all target scheduling units as a first scheduling unit, wherein the target scheduling units are scheduling units including the to-be-adjusted node;
   decreasing a carrying bandwidth of the to-be-adjusted node in the first scheduling unit by the to-be-adjusted bandwidth amount corresponding to the to-be-adjusted node; and
   increasing a total carrying bandwidth amount of the target nodes in the first scheduling unit by the to-be-adjusted bandwidth amount corresponding to the to-be-adjusted node.

3. The method according to claim 2, wherein when the to-be-adjusted node does not meet the target condition, the step of, for each to-be-adjusted node, decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node comprises:
   determining whether there is only one target scheduling unit for the to-be-adjusted node;
   when there is only one target scheduling unit for the to-be-adjusted node, decreasing the total carrying bandwidth amount of the to-be-adjusted node by the to-be-adjusted bandwidth amount corresponding to the to-be-adjusted node, and increasing the carrying bandwidth of the target nodes in the target scheduling unit by the to-be-adjusted bandwidth corresponding to the to-be-adjusted node;
   when there are two or more target scheduling units of the to-be-adjusted node, calculating a first ratio of total available bandwidth amounts of all target scheduling units;
   calculating an increase amount for each of the target scheduling units based on the calculated first ratio and the to-be-adjusted bandwidth amount of the to-be-adjusted node; and
   for each of the target scheduling units, increasing a total carrying bandwidth amount of the target nodes in the target scheduling unit by an increase amount corresponding to this target scheduling unit, and decreasing a carrying bandwidth of the to-be-adjusted node in the target scheduling unit by the increase amount corresponding to this target scheduling unit.

4. The method according to claim 3, wherein the step of, for each of the target scheduling units, increasing a total carrying bandwidth amount of the target nodes in the target scheduling unit by an increase amount corresponding to this target scheduling unit, and decreasing a carrying bandwidth of the to-be-adjusted node in the target scheduling unit by the increase amount corresponding to this target scheduling unit comprises:
   for each of the target scheduling units, determining whether only one target node is included in the target scheduling unit;
   when only one target node is included in the target scheduling unit, increasing the total carrying bandwidth amount of the target node in the target scheduling unit by the increase amount corresponding to this target scheduling unit and decreasing the carrying bandwidth of the to-be-adjusted node in the target scheduling unit by the increase amount corresponding to this target scheduling unit;

when two or more target nodes are included in the target scheduling unit, calculating a second ratio of available bandwidths of the target nodes in the target scheduling unit; calculating an adjustment value for each target node in the target scheduling unit based on the calculated second ratio and the calculated increase amount for the target scheduling unit; and increasing the carrying bandwidth of each target node in the target scheduling unit by a to-be-adjusted bandwidth amount corresponding to this target node and decreasing the carrying bandwidth of the to-be-adjusted node in the target scheduling unit by the increase amount corresponding to the target scheduling unit.

5. The method according to claim 1, wherein the step of, for each to-be-adjusted node, decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node comprises:

for each to-be-adjusted node, selecting a reference scheduling unit for the to-be-adjusted node from the scheduling units including the to-be-adjusted node by a greedy algorithm, decreasing the total carrying bandwidth amount of the to-be-adjusted node by the to-be-adjusted bandwidth amount corresponding to the to-be-adjusted node and increasing a total carrying bandwidth amount of the reference scheduling unit for the to-be-adjusted node by the to-be-adjusted bandwidth amount corresponding to the to-be-adjusted node.

6. The method according to claim 1, wherein the step of, for each to-be-adjusted node, decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node comprises:

for each to-be-adjusted node, selecting one unselected target scheduling unit from all target scheduling units of the to-be-adjusted node as a second scheduling unit;

determining whether a total available bandwidth amount of the target nodes in the second scheduling unit is greater than a remaining to-be-adjusted bandwidth amount of the to-be-adjusted node, wherein the remaining to-be-adjusted bandwidth amount of the to-be-adjusted node is a difference between the to-be-adjusted bandwidth amount of the to-be-adjusted node and an adjusted bandwidth amount of the to-be-adjusted node;

when the total available bandwidth amount of the target nodes in the second scheduling unit is greater than the remaining to-be-adjusted bandwidth amount of the to-be-adjusted node, determining whether the remaining to-be-adjusted bandwidth amount of the to-be-adjusted node is greater than a carrying bandwidth of the to-be-adjusted node in the second scheduling unit;

when the remaining to-be-adjusted bandwidth amount of the to-be-adjusted node is less than or equal to the carrying bandwidth of the to-be-adjusted node in the second scheduling unit, increasing the total carrying bandwidth amount of the target nodes in the second scheduling unit by the remaining to-be-adjusted bandwidth amount of the to-be-adjusted node and decreasing the carrying bandwidth of the to-be-adjusted node in the second scheduling unit by the remaining to-be-adjusted bandwidth amount of the to-be-adjusted node;

when the remaining to-be-adjusted bandwidth amount of the to-be-adjusted node is greater than the carrying bandwidth of the to-be-adjusted node in the second scheduling unit, increasing the total carrying bandwidth amount of the target nodes in the second scheduling unit by a target value and decreasing the carrying bandwidth of the to-be-adjusted node in the second scheduling unit by the target value; and returning to perform the step of selecting one unselected target scheduling unit from all target scheduling units of the to-be-adjusted node as a second scheduling unit, until the remaining to-be-adjusted bandwidth amount of the to-be-adjusted node is zero, wherein the target value is determined based on the carrying bandwidth of the to-be-adjusted node in the second scheduling unit, and is less than or equal to the carrying bandwidth of the to-be-adjusted node in the second scheduling unit; and when the total available bandwidth amount of the target nodes in the second scheduling unit is less than or equal to the remaining to-be-adjusted bandwidth amount of the to-be-adjusted node, increasing the total carrying bandwidth amount of the target nodes in the second scheduling unit by the total available bandwidth amount of the target nodes in the second scheduling unit and decreasing the carrying bandwidth of the to-be-adjusted node in the second scheduling unit by the total available bandwidth amount of the target nodes in the second scheduling unit; and returning to perform the step of selecting one unselected target scheduling unit from all target scheduling units of the to-be-adjusted node as a second scheduling unit, until the remaining to-be-adjusted bandwidth amount of the to-be-adjusted node is zero.

7. The method according to claim 6, wherein the step of, for each to-be-adjusted node, selecting one unselected target scheduling unit from all target scheduling units of the to-be-adjusted node as a second scheduling unit comprises:

for each to-be-adjusted node, selecting one target scheduling unit that is not currently selected and is at a foremost position in the target scheduling units ordered in a preset manner, as the second scheduling unit, wherein the preset manner indicates ordering the scheduling units in a descending order based on total available bandwidth amounts of the target nodes and used bandwidths of the to-be-adjusted node in the target scheduling units.

8. The method according to claim 1, wherein when the overload bandwidth of the overload node is greater than a total reference available bandwidth amount of the overload node, the method further comprises:

determining whether the overload bandwidth of the overload node is within a preset tolerance interval for the overload node, wherein the tolerance interval is determined by a preset second bandwidth threshold corresponding to the overload node and the preset first bandwidth threshold corresponding to the overload node;

when the overload bandwidth of the overload node is not within the preset tolerance interval for the overload node, determining whether a target bandwidth of the overload node is greater than the total available bandwidth amount of all of the target nodes for the overload node, wherein the target bandwidth of the overload node is a difference between the total used bandwidth amount of the overload node and the preset second bandwidth threshold corresponding to the overload node;

when the target bandwidth of the overload node is greater than the total available bandwidth amount of all of the target nodes for the overload node, decreasing a total carrying bandwidth amount of the target nodes for the overload node in a third scheduling unit(s) by the target bandwidth, increasing a total carrying bandwidth amount of a reference node(s) in the third scheduling unit(s) by the target bandwidth, decreasing the total carrying bandwidth amount of the overload node in the target scheduling unit for the overload node by the target bandwidth, and increasing the total carrying bandwidth amount of the target nodes for the overload node in the target scheduling unit by the target bandwidth, wherein the third scheduling unit(s) is a scheduling unit(s) that includes the target nodes for the overload node, except for the target scheduling units including the overload node; the reference node(s) is a node(s) other than the target nodes for the overload node and the overload node in the third scheduling unit(s).

9. An apparatus for bandwidth adjustment, comprising:
a memory that stores executable modules; and
a processor, coupled to the memory, that executes or facilitates execution of the executable modules, the executable modules comprising:
an obtaining module, configured for obtaining an overload node(s), wherein each of the overload node(s) is a node whose total used bandwidth amount is greater than a preset first bandwidth threshold corresponding to the overload node;
a first judging module, configured for, for each of the overload node(s), determining whether an overload bandwidth of the overload node is greater than a total current available bandwidth amount of all of target nodes for the overload node, wherein the overload bandwidth of the overload node is a difference between the total used bandwidth amount of the overload node and the preset first bandwidth threshold corresponding to the overload node; the target nodes for the overload node is a node(s) whose total used bandwidth amount is less than the preset first bandwidth threshold corresponding to the overload node in all scheduling units including the overload node;
a determining module, configured for when the overload bandwidth of the overload node is less than or equal to the total current available bandwidth amount of all of the target nodes for the overload node, determining a to-be-adjusted bandwidth amount of the overload node based on the overload bandwidth of the overload node;
a first adjusting module, configured for, for each to-be-adjusted node, decreasing a total carrying bandwidth amount of the to-be-adjusted node by the to-be-adjusted bandwidth amount corresponding to the to-be-adjusted node, and increasing a total target carrying bandwidth amount of the to-be-adjusted node by the to-be-adjusted bandwidth amount corresponding to the to-be-adjusted node, wherein the to-be-adjusted node is an overload node whose overload bandwidth is less than or equal to the total available bandwidth amount of all of target nodes for the to-be-adjusted node; the total target carrying bandwidth amount of the to-be-adjusted node is a sum of current carrying bandwidths of all of the target nodes for the to-be-adjusted node; an increase carrying bandwidth amount of one target node in one scheduling unit is less than or equal to an available bandwidth of the target node in the scheduling unit, and is less than or equal to the to-be-adjusted bandwidth amount of the to-be-adjusted node.

10. The apparatus according to claim 9, the first adjusting module comprises:
a first judging sub-module, configured for, for each to-be-adjusted node, determining whether the to-be-adjusted node meets a target condition, wherein the target condition is that the overload bandwidth of the to-be-adjusted node is less than a first preset threshold corresponding to the to-be-adjusted node, and the total available bandwidth amount of all of the target nodes for the to-be-adjusted node is greater than a second preset threshold corresponding to the to-be-adjusted node, wherein the second preset threshold is greater than the first preset threshold;
a first selecting sub-module, configured for when the to-be-adjusted node meets the target condition, selecting one target scheduling unit whose total available bandwidth amount is greater than the to-be-adjusted bandwidth amount of the to-be-adjusted node from all target scheduling units as a first scheduling unit, wherein the target scheduling units are scheduling units including the to-be-adjusted node;
a first adjusting sub-module, configured for decreasing a carrying bandwidth of the to-be-adjusted node in the first scheduling unit by the to-be-adjusted bandwidth amount corresponding to the to-be-adjusted node; and
a second adjusting sub-module, configured for increasing a total carrying bandwidth amount of the target nodes in the first scheduling unit by the to-be-adjusted bandwidth amount corresponding to the to-be-adjusted node.

11. The apparatus according to claim 10, wherein the first adjusting module further comprises:
a second judging sub-module, configured for, when the to-be-adjusted node does not meet the target condition, determining whether there is only one target scheduling unit for the to-be-adjusted node;
a third adjusting sub-module, configured for when there is only one target scheduling unit for the to-be-adjusted node, decreasing the total carrying bandwidth amount of the to-be-adjusted node by the to-be-adjusted bandwidth amount corresponding to the to-be-adjusted node, and increasing the carrying bandwidth of the target nodes in the target scheduling unit by the to-be-adjusted bandwidth corresponding to the to-be-adjusted node;
a first calculating sub-module, configured for when there are two or more target scheduling units of the to-be-adjusted node, calculating a first ratio of total available bandwidth amounts of all target scheduling units;
a second calculating sub-module, configured for calculating an increase amount for each of the target scheduling units based on the calculated first ratio and the to-be-adjusted bandwidth amount of the to-be-adjusted node; and
a fourth adjusting sub-module, configured for, for each of the target scheduling units, increasing a total carrying bandwidth amount of the target nodes in the target scheduling unit by an increase amount corresponding to this target scheduling unit, and decreasing a carrying bandwidth of the to-be-adjusted node in the target scheduling unit by the increase amount corresponding to this target scheduling unit.

12. The apparatus according to claim 11, wherein the fourth adjusting sub-module comprises:
- a first judging unit, configured for, for each of the target scheduling units, determining whether only one target node is included in the target scheduling unit;
- a first adjusting unit, configured for, when only one target node is included in the target scheduling unit, increasing the total carrying bandwidth amount of the target node in the target scheduling unit by the increase amount corresponding to this target scheduling unit and decreasing the carrying bandwidth of the to-be-adjusted node in the target scheduling unit by the increase amount corresponding to this target scheduling unit;
- a first calculating unit, configured for when two or more target nodes are included in the target scheduling unit, calculating a second ratio of available bandwidths of the target nodes in the target scheduling unit;
- a second calculating unit, configured for calculating an adjustment value for each target node in the target scheduling unit based on the calculated second ratio and the calculated increase amount for the target scheduling unit; and
- a second adjusting unit, configured for increasing the carrying bandwidth of each target node in the target scheduling unit by a to-be-adjusted bandwidth amount corresponding to this target node and decreasing the carrying bandwidth of the to-be-adjusted node in the target scheduling unit by the increase amount corresponding to the target scheduling unit.

13. The apparatus according to claim 9, wherein the first adjusting module is configured for, for each to-be-adjusted node, selecting a reference scheduling unit for the to-be-adjusted node from the scheduling units including the to-be-adjusted node by a greedy algorithm, decreasing the total carrying bandwidth amount of the to-be-adjusted node by the to-be-adjusted bandwidth amount corresponding to the to-be-adjusted node and increasing a total carrying bandwidth amount of the reference scheduling unit for the to-be-adjusted node by the to-be-adjusted bandwidth amount corresponding to the to-be-adjusted node.

14. The apparatus according to claim 9, wherein the first adjusting module comprises:
- a second selecting sub-module, configured for, for each to-be-adjusted node, selecting one unselected target scheduling unit from all target scheduling units of the to-be-adjusted node as a second scheduling unit;
- a third judging sub-module, configured for determining whether a total available bandwidth amount of the target nodes in the second scheduling unit is greater than a remaining to-be-adjusted bandwidth amount of the to-be-adjusted node, wherein the remaining to-be-adjusted bandwidth amount of the to-be-adjusted node is a difference between the to-be-adjusted bandwidth amount of the to-be-adjusted node and an adjusted bandwidth amount of the to-be-adjusted node;
- a fourth judging sub-module, configured for when the total available bandwidth amount of the target nodes in the second scheduling unit is greater than the remaining to-be-adjusted bandwidth amount of the to-be-adjusted node, determining whether the remaining to-be-adjusted bandwidth amount of the to-be-adjusted node is greater than a carrying bandwidth of the to-be-adjusted node in the second scheduling unit;
- a fifth adjusting sub-module, configured for when the remaining to-be-adjusted bandwidth amount of the to-be-adjusted node is less than or equal to the carrying bandwidth of the to-be-adjusted node in the second scheduling unit, increasing the total carrying bandwidth amount of the target nodes in the second scheduling unit by the remaining to-be-adjusted bandwidth amount of the to-be-adjusted node and decreasing the carrying bandwidth of the to-be-adjusted node in the second scheduling unit by the remaining to-be-adjusted bandwidth amount of the to-be-adjusted node;
- a sixth adjusting sub-module, configured for when the remaining to-be-adjusted bandwidth amount of the to-be-adjusted node is greater than the carrying bandwidth of the to-be-adjusted node in the second scheduling unit, increasing the total carrying bandwidth amount of the target nodes in the second scheduling unit by a target value and decreasing the carrying bandwidth of the to-be-adjusted node in the second scheduling unit by the target value; and
- returning to perform the second selecting sub-module, until the remaining to-be-adjusted bandwidth amount of the to-be-adjusted node is zero, wherein the target value is determined based on the carrying bandwidth of the to-be-adjusted node in the second scheduling unit, and is less than or equal to the carrying bandwidth of the to-be-adjusted node in the second scheduling unit; and
- a seventh adjusting sub-module, configured for when the total available bandwidth amount of the target nodes in the second scheduling unit is less than or equal to the remaining to-be-adjusted bandwidth amount of the to-be-adjusted node, increasing the total carrying bandwidth amount of the target nodes in the second scheduling unit by the total available bandwidth amount of the target nodes in the second scheduling unit and decreasing the carrying bandwidth of the to-be-adjusted node in the second scheduling unit by the total available bandwidth amount of the target nodes in the second scheduling unit; and returning to perform the second selecting sub-module, until the remaining to-be-adjusted bandwidth amount of the to-be-adjusted node is zero.

15. The apparatus according to claim 14, wherein, the second selecting sub-module is configured for, for each to-be-adjusted node, selecting one target scheduling unit that is not currently selected and is at a foremost position in the target scheduling units ordered in a preset manner, as the second scheduling unit, wherein the preset manner indicates ordering the scheduling units in a descending order based on total available bandwidth amounts of the target nodes and used bandwidths of the to-be-adjusted node in the target scheduling units.

16. The apparatus according to claim 9, wherein, the executable modules further comprise:
- a second judging module, configured for, when the overload bandwidth of the overload node is greater than the total current available bandwidth amount of all of the target nodes for the overload node and when the overload bandwidth of the overload node is greater than a total reference available bandwidth amount of the overload node, determining whether the overload bandwidth of the overload node is within a preset tolerance interval for the overload node, wherein the tolerance interval is determined by a preset second bandwidth threshold corresponding to the overload node and the preset first bandwidth threshold corresponding to the overload node;
- a third judging module, configured for when the overload bandwidth of the overload node is not within the preset tolerance interval for the overload node, determining whether a target bandwidth of the overload node is greater than the total available bandwidth amount of all of the target nodes for the overload node, wherein the target bandwidth of the overload node is a difference between the total used bandwidth amount of the overload node and the preset second bandwidth threshold corresponding to the overload node; and a second adjusting module, configured for when the target bandwidth of the overload node is greater than the total available bandwidth amount of the target nodes for the overload node, decreasing a total carrying bandwidth amount of the target nodes for the overload node in a third scheduling unit(s) by the target bandwidth, increasing a total carrying bandwidth amount of a reference node(s) in the third scheduling unit(s) by the target bandwidth, decreasing the total carrying bandwidth amount of the overload node in the target scheduling unit for the overload node by the target bandwidth, and increasing the total carrying bandwidth amount of the target nodes for the overload node in the target scheduling unit by the target bandwidth, wherein the third scheduling unit(s) is a scheduling unit(s) that includes the target nodes for the overload node, except for the target scheduling units including the overload node; the reference node(s) is a node(s) other than the target nodes for the overload node and the overload node in the third scheduling unit(s).

17. An electronic device comprising a processor and a memory, wherein, the memory is configured to store a computer program;

the processor is configured to perform the method according to claim 1 when executing the program stored in the memory.

18. A non-transitory computer-readable storage medium, wherein a computer program is stored in the computer-readable storage medium, and the computer program is executed by a processor to cause the processor to perform the method according to claim 1.

* * * * *